US012609896B2

(12) United States Patent
Ghosh et al.

(10) Patent No.: US 12,609,896 B2
(45) Date of Patent: Apr. 21, 2026

(54) DISABLING LINK FOR LENGTH OF TIME

(71) Applicant: Juniper Networks, Inc., Sunnyvale, CA (US)

(72) Inventors: Sandip Kumar Ghosh, Bangalore (IN); Erin C. Macneil, Carp (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 89 days.

(21) Appl. No.: 18/504,866

(22) Filed: Nov. 8, 2023

(65) Prior Publication Data

US 2025/0106093 A1 Mar. 27, 2025

(30) Foreign Application Priority Data

Sep. 26, 2023 (IN) .............................. 202341064503

(51) Int. Cl.
*H04L 43/10* (2022.01)
*G06F 1/28* (2006.01)
(Continued)

(52) U.S. Cl.
CPC ................ *H04L 45/70* (2013.01); *G06F 1/28* (2013.01); *G06F 1/3206* (2013.01);
(Continued)

(58) Field of Classification Search
CPC ..... H04L 45/70; H04L 45/03; H04L 41/0622; H04L 41/0627; H04L 41/069; H04L 43/10; H04L 45/02; H04L 47/12; H04L 47/125
See application file for complete search history.

(56) References Cited

U.S. PATENT DOCUMENTS 7,417,985 B1 8/2008 McCrosky et al.
8,340,111 B1 12/2012 Krivitski et al.
(Continued)

FOREIGN PATENT DOCUMENTS

CN 116017782 A 4/2023
EP 4061063 A1 9/2022
(Continued)

OTHER PUBLICATIONS

Extended European Search Report for European Application No. EP24150429.9 dated Jul. 2, 2024, 11 pages.
(Continued)

*Primary Examiner* — Minh Chau Nguyen
(74) *Attorney, Agent, or Firm* — Harrity & Harrity, LLP

(57) ABSTRACT

In some implementations, a network device may transmit, based on a time window, a request to disable a link for a candidate length of time. The network device may receive, based on the candidate length of time, an indication to disable the link for a length of time. The network device may power off one or more components associated with the link based on the indication to disable the link for the length of time. In some implementations, a network device may receive a request to disable a link for a candidate length of time. The network device may transmit, based on the candidate length of time and a time window, an indication to disable the link for a length of time. The network device may power off one or more components associated with the link based on the indication to disable the link for the length of time.

20 Claims, 17 Drawing Sheets

100

110
Request to disable a link for a candidate length of time

120
Indication, based on the candidate length of time, to disable the link for a length of time First network device Second network device Link 130
Power off one or more components associated with the link based on the indication to disable the link for the length of time 140
Power off one or more components associated with the link based on the indication to disable the link for the length of time

(51) Int. Cl.

| | |
|---|---|
| *G06F 1/3206* | (2019.01) |
| *G06F 1/3234* | (2019.01) |
| *H04L 12/12* | (2006.01) |
| *H04L 41/0604* | (2022.01) |
| *H04L 41/069* | (2022.01) |
| *H04L 45/00* | (2022.01) |
| *H04L 45/02* | (2022.01) |
| *H04L 45/03* | (2022.01) |
| *H04L 45/12* | (2022.01) |
| *H04L 45/24* | (2022.01) |
| *H04L 45/28* | (2022.01) |
| *H04L 47/10* | (2022.01) |
| *H04L 47/12* | (2022.01) |
| *H04L 47/125* | (2022.01) |
| *H04W 52/02* | (2009.01) |
| *G06Q 30/018* | (2023.01) |

(52) U.S. Cl.

CPC ............ *G06F 1/3234* (2013.01); *H04L 12/12* (2013.01); *H04L 41/0622* (2013.01); *H04L 41/0627* (2013.01); *H04L 41/069* (2013.01); *H04L 43/10* (2013.01); *H04L 45/02* (2013.01); *H04L 45/03* (2022.05); *H04L 45/126* (2013.01); *H04L 45/245* (2013.01); *H04L 45/28* (2013.01); *H04L 47/12* (2013.01); *H04L 47/125* (2013.01); *H04L 47/29* (2013.01); *H04W 52/0235* (2013.01); *H04W 52/0248* (2013.01); *H04W 52/0274* (2013.01); *G06Q 30/018* (2013.01)

(56) References Cited

U.S. PATENT DOCUMENTS

| | | | | |
|---|---|---|---|---|
| 8,570,160 | B2 | 10/2013 | Speegle et al. | |
| 9,509,377 | B2 | 11/2016 | Sayana et al. | |
| 9,606,604 | B1* | 3/2017 | Butter ................... | G06F 1/3209 |
| 9,992,129 | B2* | 6/2018 | Grosso .................. | H04L 45/245 |
| 10,326,638 | B2 | 6/2019 | Banerjee et al. | |
| 2007/0201380 | A1 | 8/2007 | Ma et al. | |
| 2007/0283178 | A1* | 12/2007 | Dodeja ................. | G06F 1/3203 |
| | | | | 713/324 |
| 2008/0304519 | A1 | 12/2008 | Koenen et al. | |
| 2009/0204828 | A1 | 8/2009 | Diab et al. | |
| 2010/0057386 | A1 | 3/2010 | Hillis et al. | |
| 2010/0118753 | A1* | 5/2010 | Mandin ................. | H04L 67/145 |
| | | | | 370/311 |
| 2012/0127894 | A1 | 5/2012 | Nachum | |
| 2013/0003559 | A1 | 1/2013 | Matthews | |
| 2013/0042126 | A1* | 2/2013 | Ganesan .............. | G06F 1/3275 |
| | | | | 713/324 |
| 2013/0070754 | A1 | 3/2013 | Iovanna et al. | |
| 2014/0119252 | A1* | 5/2014 | Kella ................ | H04W 52/0216 |
| | | | | 370/311 |
| 2014/0155029 | A1* | 6/2014 | Kolaks .................. | H04W 12/08 |
| | | | | 455/411 |
| 2014/0169176 | A1 | 6/2014 | Brock | |
| 2014/0191733 | A1 | 7/2014 | Kaanta et al. | |
| 2014/0372576 | A1* | 12/2014 | Mohandas ............ | H04L 49/354 |
| | | | | 709/220 |
| 2015/0188354 | A1 | 7/2015 | Sun et al. | |
| 2015/0208341 | A1 | 7/2015 | Mohamed et al. | |
| 2015/0312769 | A1 | 10/2015 | Shindo | |
| 2016/0197784 | A1 | 7/2016 | Gandhi et al. | |
| 2016/0253522 | A1* | 9/2016 | Wirch ..................... | G06F 16/38 |
| | | | | 726/3 |
| 2016/0302203 | A1 | 10/2016 | Liu et al. | |
| 2017/0117709 | A1 | 4/2017 | Svedendahl et al. | |
| 2017/0214539 | A1 | 7/2017 | Chu et al. | |
| 2018/0241466 | A1* | 8/2018 | Inagaki .................. | H04B 10/07 |
| 2018/0343613 | A1 | 11/2018 | Levy et al. | |
| 2019/0163255 | A1* | 5/2019 | Dewey .................. | G06F 1/3287 |
| 2019/0190575 | A1 | 6/2019 | Stjernman et al. | |
| 2020/0067821 | A1* | 2/2020 | Sebastian ................ | H04L 45/28 |
| 2022/0116862 | A1* | 4/2022 | Cariou .................. | H04W 76/34 |
| 2022/0166705 | A1 | 5/2022 | Froese | |
| 2022/0369403 | A1 | 11/2022 | Fang et al. | |
| 2023/0062989 | A1 | 3/2023 | Kim et al. | |
| 2024/0205823 | A1 | 6/2024 | Yang et al. | |
| 2024/0214313 | A1 | 6/2024 | Voit et al. | |
| 2024/0333590 | A1 | 10/2024 | Pignataro et al. | |
| 2024/0422101 | A1 | 12/2024 | Sivakumar et al. | |
| 2025/0039097 | A1 | 1/2025 | Kazimirsky et al. | |
| 2025/0080464 | A1 | 3/2025 | Pignataro et al. | |

FOREIGN PATENT DOCUMENTS

| | | |
|---|---|---|
| WO | 2012155987 A1 | 11/2012 |
| WO | 2022228085 A1 | 11/2022 |

OTHER PUBLICATIONS

Gupta, M., et al., Dynamic Ethernet Link Shutdown for Energy Conservation on Ethernet Links, IEEE International Conference on Communications (ICC), Jun. 1, 2007, pp. 6156-6161.

IEEE Standards Association, Station and Media Access Control Connectivity Discovery, 2016, 146 pages(s), IEEE, New York, NY, USA.

Junos OS , User Access and Authentication Administration Guide for Junos OS, Jun. 14, 2023, 1786 pages(s), Juniper Networks Inc, Sunnyvale, California, USA.

Bierman et al., "A YANG Data Model for Hardware Management," Internet Engineering Task Force (IETF), Request for Comments: 8348, Mar. 2018, 60 Pages.

Bierman et al., "A YANG Data Model for System Management," Internet Engineering Task Force (IETF), Request for Comments: 7317, Aug. 2014, 35 Pages.

Bjorklund et al., "The YANG 1.1 Data Modeling Language," Internet Engineering Task Force (IETF), Request for Comments: 7950, Aug. 2016, 217 Pages.

Bjorklund, M., (Ed.,) "YANG-A Data Modeling Language for the Network Configuration Protocol (Netconf)," IETF RFC 6020, http://datatracker.ietf.org/doc/rfc6020/, Oct. 2010, 173 pages.

Bonica et al., "Extended ICMP to Support Multi-Part Messages," Network Working Group, Request for Comments:4884, Apr. 2007, 19 Pages.

"Chkirbene, Z., et al., "Efficient Techniques for Energy Saving in Data Center Networks", Computer Communications, Elsevier Science Publishers Bv, Amsterdam, NL, vol. 129, Jul. 29, 2018, pp. 111-124, XP085477963, ISSN: 0140-3664, DOI: 10.1016/J.COMCOM.2018.07.025".

Dhanuka A., et al., "How to Use Energy Efficient Ethernet (IEEE 802.3az) With Texas Instruments Ethernet PHYs," Texas Instruments, SNLA328—Oct. 2019, 15 Pages.

Ethernet Switching User Guide, Juniper Networks, Website: https://standards.ieee.org/ieee/802.1AB/6047/, Dec. 14, 2023, 1158 Pages.

Extended European Search Report for European Application No. EP24151927 dated Jul. 16, 2024, 10 pages.

Extended European Search Report for European Application No. EP241871235 dated Dec. 6, 2024, 10 pages.

Extended European Search Report for European Application No. EP241877513 dated Dec. 9, 2024, 41 pages.

Extended European Search Report for European Application No. EP24188097 dated Dec. 18, 2024, 8 pages.

Ginsberg et al., "Advertising Generic Information in IS-IS," Internet Engineering Task Force (IETF), Request for Comments: Dec. 2010, 11 Pages.

IEEE Standard for Local and metropolitan area networks, "Station and Media Access Control Connectivity Discovery," IEEE Computer Society, Website: https://www.juniper.net/documentation/us/en/software/junos/useraccess/topics/ref/statement/lldp-edit-protocols.html, 2016, 146 Pages.

Martin R., "IEEE P802.1, Draft 1.0, Bridges and Bridged Networks—Link Aggregation," IEEE 802.1 Working Group, Dec. 2020, Nurnberg, Germany, 349 Pages.

(56) References Cited

OTHER PUBLICATIONS

Moy, J., "Extending OSPF to Support Demand Circuits," Network Working Group, Request for Comments: 1793, pp. 1-32, Apr. 1995.
OpenConfig: Platform model, Website: https://openconfig.net/projects/modelsischemadocs/jstree/openconfig-platform.html, Obtained Apr. 30, 2024, 199 Pages.
Website: https://en.wikipedia.org/wiki/Traceroute; Obtained Apr. 25, 2024, 5 Pages.
Prosecution history of U.S. Appl. No. 18/647,362, filed Apr. 26, 2024.

* cited by examiner

Figure 1:
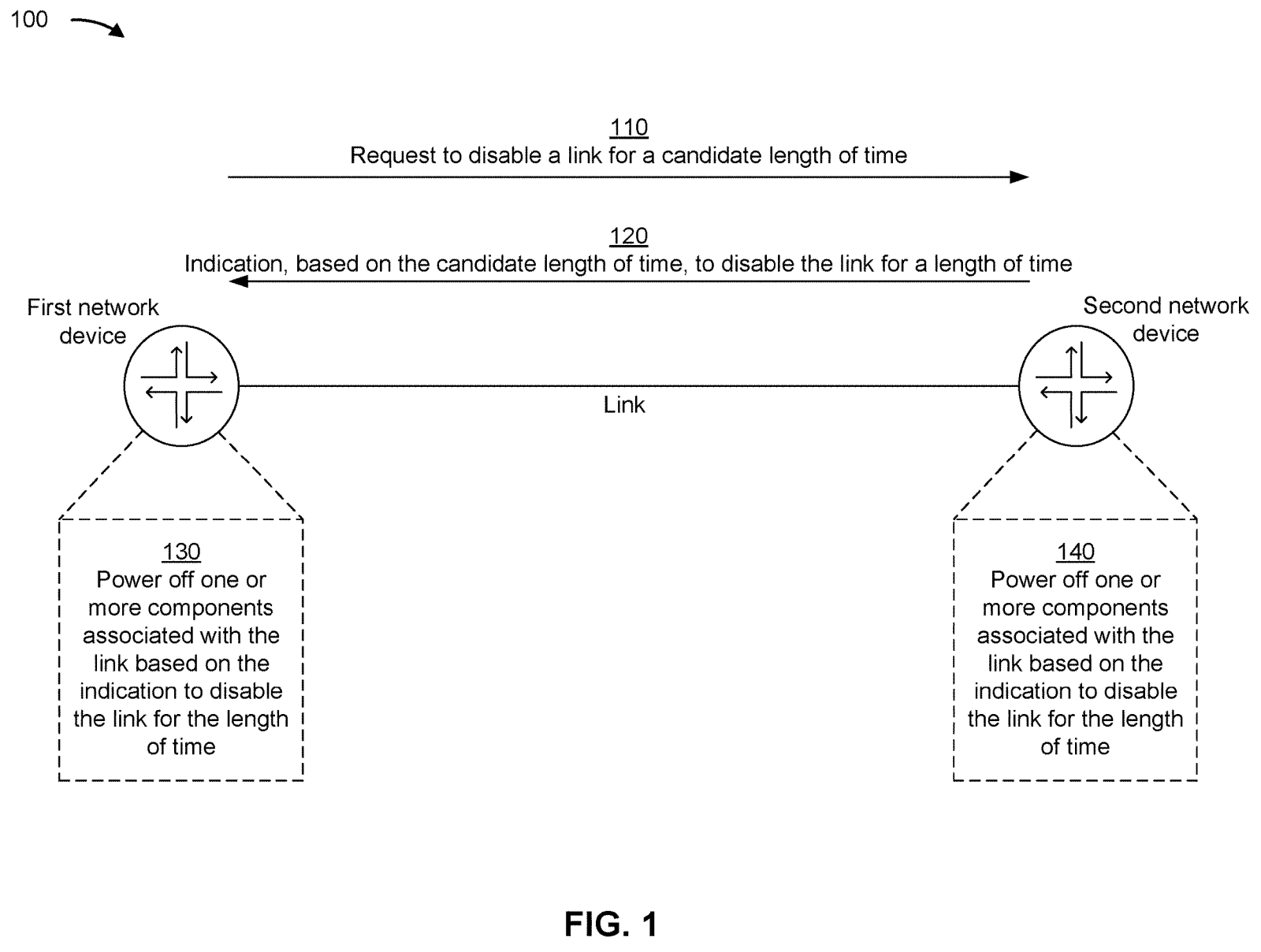

100

First network device

Second network device

110
Request to disable a link for a candidate length of time

120
Indication, based on the candidate length of time, to disable the link for a length of time Link 130
Power off one or more components associated with the link based on the indication to disable the link for the length of time 140
Power off one or more components associated with the link based on the indication to disable the link for the length of time

930
Start 25200 sec timer for link 1

932
Disable link fault alarm for link 1

934
Hold time (30 sec)

936
Power off local optics for link 1

938
Time expires

940
Power on local optics for link 1

942
Hold time (30 sec)

944
Re-enable link fault alarm for link 1

946
Determine that link 1 is up or raise link fault alarm if link 1 is not up

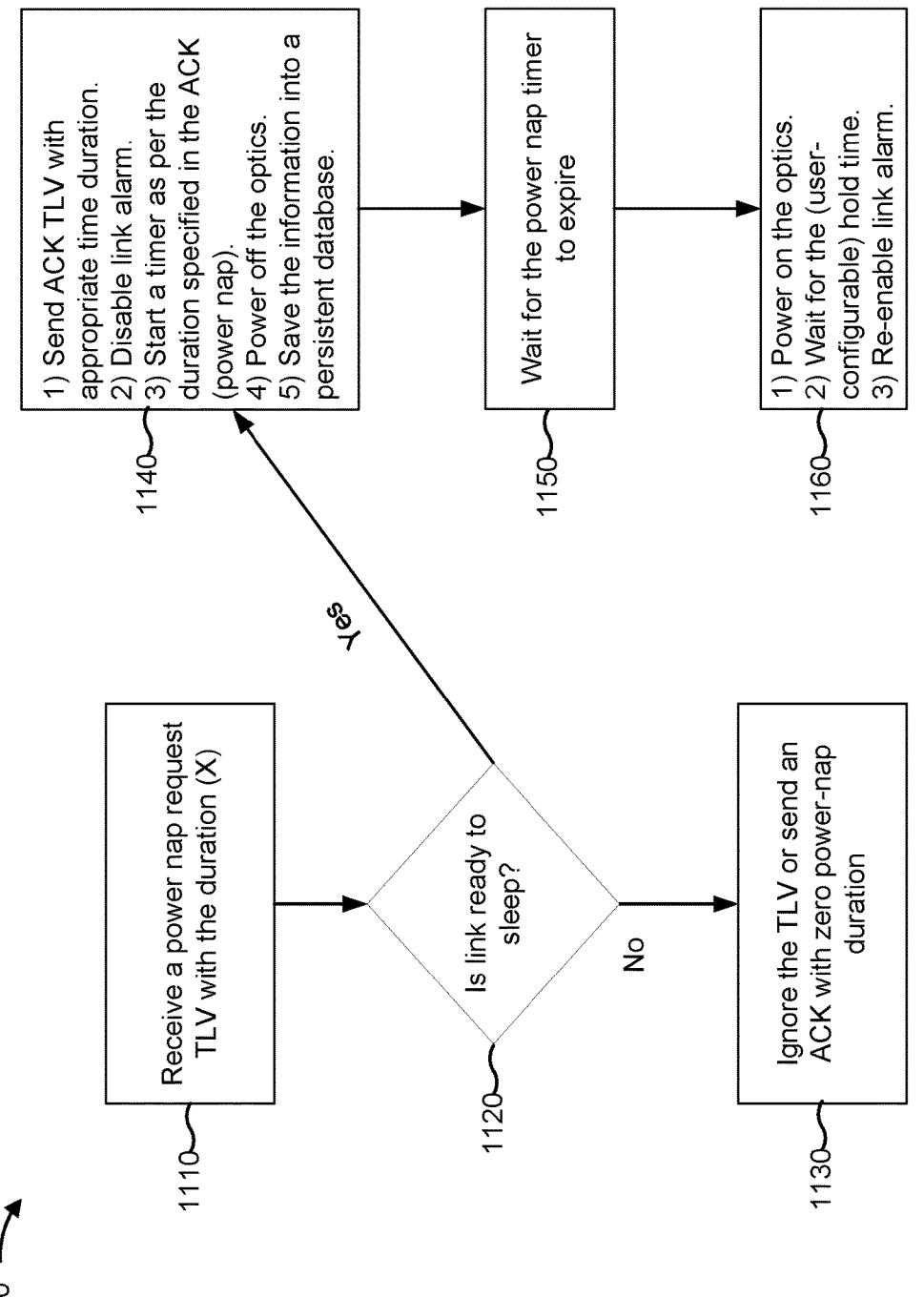

1100

1110 Receive a power nap request TLV with the duration (X)

1120 Is link ready to sleep?

Yes

No

1130 Ignore the TLV or send an ACK with zero power-nap duration 1140
1) Send ACK TLV with appropriate time duration.
2) Disable link alarm.
3) Start a timer as per the duration specified in the ACK (power nap).
4) Power off the optics.
5) Save the information into a persistent database.

1150 Wait for the power nap timer to expire 1160
1) Power on the optics.
2) Wait for the (user-configurable) hold time.
3) Re-enable link alarm.

1510 — Transmit, by a network device, based on a time window, a request to disable a link for a candidate length of time 1520 — Receive, by the network device, based on the candidate length of time, an indication to disable the link for a length of time 1530 — Power off one or more components associated with the link based on the indication to disable the link for the length of time

1500

1610 — Receive, by a network device, a request to disable a link for a candidate length of time 1620 — Transmit, by the network device, based on the candidate length of time and a time window, an indication to disable the link for a length of time 1630 — Power off one or more components associated with the link based on the indication to disable the link for the length of time

1600

DISABLING LINK FOR LENGTH OF TIME

CROSS-REFERENCE TO RELATED APPLICATION

This patent application claims priority to India Provisional Patent Application No. 202341064503, filed on Sep. 26, 2023, and entitled "SYSTEMS AND METHODS FOR PROVIDING ENERGY EFFICIENT NETWORKS." The disclosure of the prior application is considered part of and is incorporated by reference into this patent application.

BACKGROUND

Network devices can exchange network traffic over links. Network devices include interfaces or ports that support these links. An interface or port includes multiple hardware components, such as optics, a serializer/deserializer (SerDes), gearbox, or the like.

SUMMARY

Some implementations described herein relate to a method. The method may include transmitting, by a network device, based on a time window, a request to disable a link for a candidate length of time. The method may include receiving, by the network device, based on the candidate length of time, an indication to disable the link for a length of time. The method may include powering off one or more components associated with the link based on the indication to disable the link for the length of time.

Some implementations described herein relate to a method. The method may include receiving, by a network device, a request to disable a link for a candidate length of time. The method may include transmitting, by the network device, based on the candidate length of time and a time window, an indication to disable the link for a length of time. The method may include powering off one or more components associated with the link based on the indication to disable the link for the length of time.

Some implementations described herein relate to a network device. The network device may include one or more memories and one or more processors. The one or more processors may be to transmit, based on a time window, a request to disable a link for a candidate length of time. The one or more processors may be to receive, based on the candidate length of time, an indication to disable the link for a length of time. The one or more processors may be to power off one or more components associated with the link based on the indication to disable the link for the length of time.

Some implementations described herein relate to a network device. The network device may include one or more memories and one or more processors. The one or more processors may be to receive a request to disable a link for a candidate length of time. The one or more processors may be to transmit, based on the candidate length of time and a time window, an indication to disable the link for a length of time. The one or more processors may be to power off one or more components associated with the link based on the indication to disable the link for the length of time.

Some implementations described herein relate to a non-transitory computer-readable medium storing a set of instructions. The set of instructions comprises one or more instructions that, when executed by one or more processors of a network device, cause the network device to transmit, based on a time window, a request to disable a link for a candidate length of time. The one or more instructions, when executed by one or more processors of the network device, may cause the network device to receive, based on the candidate length of time, an indication to disable the link for a length of time. The one or more instructions, when executed by one or more processors of the network device, may cause the network device to power off one or more components associated with the link based on the indication to disable the link for the length of time.

Some implementations described herein relate to a non-transitory computer-readable medium storing a set of instructions. The set of instructions comprises one or more instructions that, when executed by one or more processors of a network device, cause the network device to receive a request to disable a link for a candidate length of time. The one or more instructions, when executed by one or more processors of the network device, may cause the network device to transmit, based on the candidate length of time and a time window, an indication to disable the link for a length of time. The one or more instructions, when executed by one or more processors of the network device, may cause the network device to power off one or more components associated with the link based on the indication to disable the link for the length of time.

BRIEF DESCRIPTION OF THE DRAWINGS

FIG. 1 is a diagram of an example implementation associated with disabling a link for a length of time.

FIG. 5 is a diagram of an example implementation associated with aggregated links, multichassis LAG (MC-LAG), multichassis aggregated ethernet (MC-AE), or the like.

FIG. 11 is a diagram of an example implementation associated with a receiver network device.

DETAILED DESCRIPTION

Figure 2:
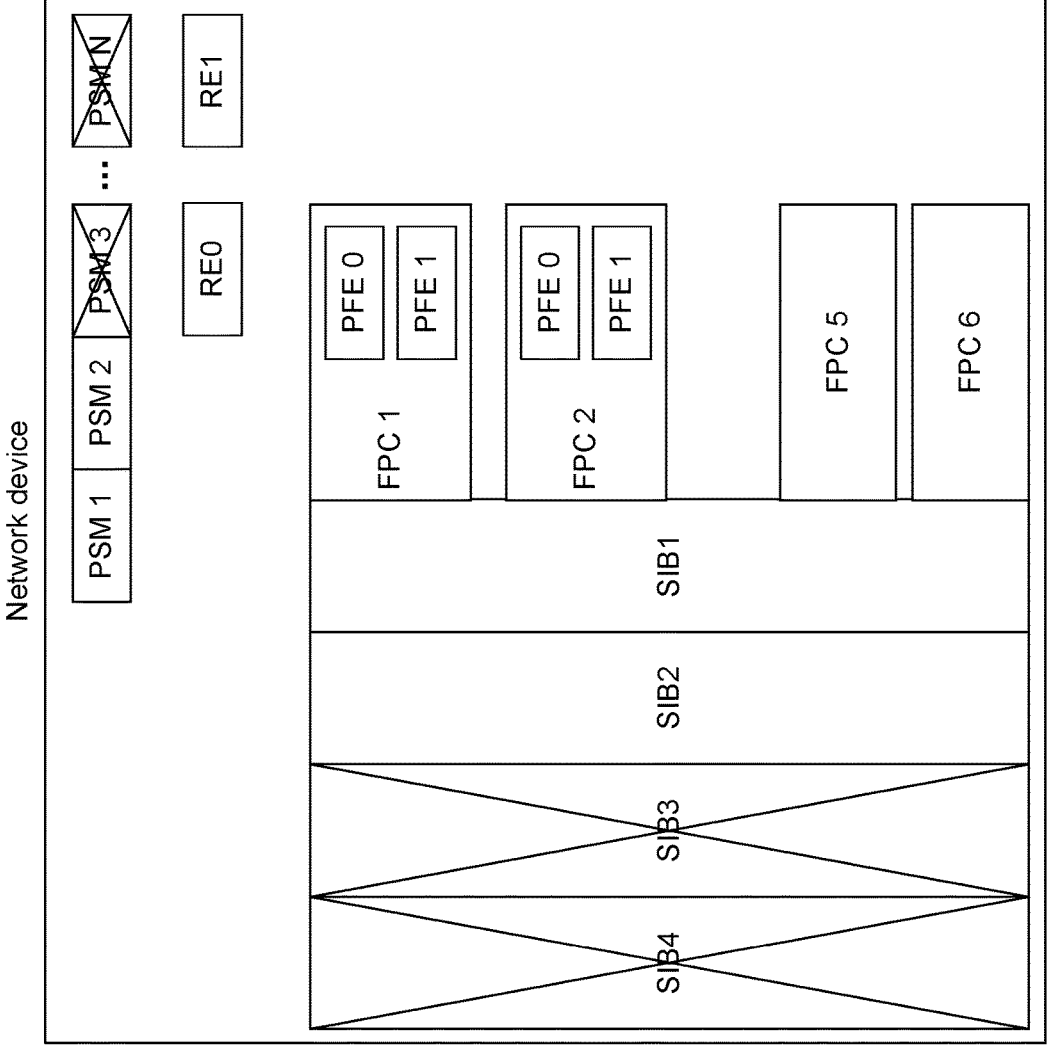
FIG. 2 is a diagram of an example implementation associated with a network device powering off components based on the indication to disable the link for the length of time.

The following detailed description of example implementations refers to the accompanying drawings. The same reference numbers in different drawings may identify the same or similar elements.

Because links, optics, and supporting internal devices can consume a significant amount of power, the total power necessary to keep an interface operational is significant. For example, interface optics, packet forwarding engine (PFE) application-specific integrated circuits (ASICs), and fabric ASICs can consume significant power in modular (and/or smaller) routers. Power consumption can be significant even when the traffic load is low, which may imply wastage of power. For example, links can consume energy when idle. For example, an interface and/or associated components can consume significant (e.g., on the order of kilowatts or more) power in an idle state with zero packets per second. The resulting electricity costs and carbon footprint of network operators (e.g., internet service providers (ISPs), cloud vendors, or the like) is also significant.

Furthermore, network devices are often controlled by different operators. In such multi-operator scenarios, network devices that support a link (e.g., the endpoint or peer devices) are under control of different operators. For example, network devices of links between autonomous systems (ASs) can be controlled by different operators. As a result, links in multi-operator scenarios cannot be controlled by a single control point. For example, if one peer device attempts to shut down a link, the other peer device may raise a link fault alarm. Shutting down a link between network devices may be further complicated if the clocks of those network devices are not synchronized.

Some implementations described herein enable disabling a link for a length of time. In some examples, network devices may engage in a handshake to switch off the link. The handshake may involve an initiator network device and a receiver network device that serve as endpoints of the link. The initiator network device may transmit a request to disable the link for a candidate length of time, and the receiver network device may respond with an indication to disable the link for a length of time based on the candidate length of time. In some examples, the length of time may be equal to or less than the candidate length of time. The initiator network device and the receiver network device may power off one or more components (e.g., optics) associated with the link for the length of time.

The initiator network device and the receiver network device may power off the component(s) based on one or more time windows. For example, the initiator network device may be associated with a first time window during which the initiator network device experiences off-peak (e.g., low) network traffic, and the receiver network device may be associated with a second time window during which the receiver network device experiences off-peak network traffic. The first time window and the second time window may have different start and/or end times.

In some examples, the initiator network device and the receiver network device may perform the handshake using LLDP. For example, the handshake may include a protocol-driven (e.g., LLDP-driven) message exchange whereby the request and the indication are transmitted as LLDP TLVs. For example, the initiator network device and the receiver network device may exchange LLDP protocol data units (PDUs), perform the handshake, and then shut down the link.

As a result, by powering off the one or more components for the length of time, the network devices may conserve power that would otherwise be consumed to maintain the link. For example, the link and/or components, such as the optics, may enter a "power nap" state when the first and second time windows of the network devices overlap. The network devices may transition one or more components to the power nap state even if the network devices belong to different operators. For example, the network devices may exchange the request and the indication regardless of whether the network devices are controlled by the same or different operators. Thus, neither network device raises a link fault alarm when the link is shut down. Moreover, because the indication and/or the request indicate the length of time for which the link is to remain disabled, the network devices may mutually determine how long the power nap is to extend even if the clocks of the network devices are not synchronized.

FIG. 1 is a diagram of an example implementation 100 associated with disabling a link for a length of time. As shown in FIG. 1, example implementation 100 includes a first network device (e.g., an initiator network device) and a second network device (e.g., a receiver network device). These devices are described in more detail below in connection with FIGS. 12-14.

The first and second network devices may be endpoint devices for a link. The first network device may identify a time window associated with the first network device, and the second network device may identify a time window associated with the second network device. The time windows may be associated with off-peak network traffic for the first and second network devices. For example, during the time windows, the first and second network devices may experience low rates of network traffic. Thus, the first and second network devices may determine respective off-peak hours. For example, the time window (e.g., off-peak hours) for the first network device may be 10:00 PM to 6:00 AM, and the time window (e.g., off-peak hours) for the second network device may be 11:00 PM to 8:00 AM.

In some aspects, the first and second network devices may identify the time windows based on respective policies. The policies may be power saving policies (e.g., interface-power-saving policies, such as power-saving policies that apply on a per-interface basis). For example, the policies may prompt the first and second network devices to attempt to enter respective interfaces into a power nap state. The policies may save power in the sense that the policies may be link shutdown policies.

Taking the first network device as an example, a user may configure the policy for the first network device. For example, the user may configure the policy, using a user interface, locally in the first network device. Similarly, a user (e.g., the same user or a different user) may configure the policy for the second network device. For example, the user may configure the policy, using a user interface, locally in the second network device. Thus, the user(s) may set the link shutdown policies.

An example policy for an interface on the first network device or the second network device is provided as follows.

```
Interface et-1/0/0 {
    Power-saving-policy {
```

5

-continued

```
Rules { condition 1, 2, 3 ... }
    Actions { {Power-nap duration X sec} OR {lower-the-speed Y sec} }
    }
}
```

The policy be based on any suitable factor, such as load, time, the quantity of routes reachable over the interface, or the like. In some examples, the policy may enable the operator of the first or second network device to power off optics of the first or second network device or the link for 2 hours when the load has been less than 10% of the maximum load for the last 30 minutes. In some examples, the policy may enable the operator to disable the link for 60 minutes if the load on the interface (e.g., interface xe-1/0/0) has been less than 10% of the maximum load for the last 30 minutes. In some examples, the policy may enable the operator to turn off the link (e.g., allow the link to enter a power nap state) for 120 minutes if the current time is between 8:00 PM and 6:00 AM and the load on the interface xe-2/0/0 has been less than 15% of the maximum load for the last 20 minutes. As used herein, "maximum load" may refer to a maximum amount of network traffic (e.g., a maximum rate of network traffic) that can be supported by a link at a given time.

In some aspects, the first and second network devices may identify the time windows based on respective configurations. The configurations may configure the time windows directly for the first and second network devices. The configuration for the first network device may be configured by a user, control point, machine learning (ML) or artificial intelligence (AI) process, or the like, and the configuration for the second network device may be configured by the same or a different user, the same or a different control point, the same or a different ML or AI process, or the like.

An example configuration for an interface on the first network device or the second network device is provided as follows.

```
Interface et-1/0/0 {
    Power-saving {
        Window 1 {
            start time 10:00PM
            duration 3hrs
            Actions { power-nap}
        }
        Window N {
            start time 5:00AM
            duration 2hrs
            Actions { power-nap}
        }
    }
}
```

The user, control point, and/or AI/ML process may configure multiple time windows for a given interface. For each time window, the user, control point, and/or AI/ML process may configure a start time, a duration (e.g., off-peak hours), and one or more actions. In some examples, the user, control point, and/or AI/ML process may configure only the duration or policy, and the other parameters may be local. For example, the user may configure the policy and the network device may automatically determine the time window based on the configured policy, or the user may directly configure the time window. In some examples, the user, control point, and/or AI/ML process may set the duration locally in the first or second network device and may select an action for each time window. Examples of actions include initiating a power nap (which may involve disabling optics and/or other related components), lowering a speed of the interface (if supported), or the like.

The first and second network device may engage in a handshake to disable the link in a controlled manner. In some aspects, the first network device may transmit, based on the time window of the first network device, a request to disable the link for a candidate length of time. For example, if the time window for the first network device is 10:00 PM to 6:00 AM, then the first network device may transmit, at 10:00 PM, a request to disable the link for eight hours. In some examples, upon receiving the request to disable the link for the candidate length of time, the second network device may transmit (and the first network device may receive) a rejection associated with the request. For instance, the rejection may be an explicit negative acknowledgment or an acknowledgment with an indication of a zero-length time window. In some examples, the first network device may treat no response from the second network device as an implicit rejection. Thus, for example, any response (or non-response) other than an explicit acknowledgment with an indication of a non-zero time window may serve as a rejection. The second network device may reject the request because the time window of the second network device has not yet begun. For example, the second network device may not agree to disable the link during non-off-peak hours for the second network device.

As shown by reference number 110, the first network device may transmit, and the second network device may receive, based on the time window of the first network device, a request to disable the link for another candidate length of time. For example, the first network device may transmit the request to disable the link for the other candidate length of time a period of time after transmitting the request to disable the link for the candidate length of time, and the other candidate length of time may be based on the candidate length of time and the period of time. For example, the period of time may be one hour, meaning that the first network device may transmit the request to disable the link one hour after transmitting the request to disable the link for the candidate length of time (e.g., the first network device may transmit the request to disable the link at 11:00 PM). In this case, the other candidate length of time may be seven hours (e.g., the length of time extends until 6:00 AM). In some examples, the first network device may transmit requests to disable the link for candidate lengths of time periodically (e.g., the first network device may transmit a request to disable the link for a candidate length of time every 30 seconds).

As shown by reference number 120, the second network device may transmit, based on the time window of the second network device, an indication to disable the link for a length of time based on the other candidate length of time. For example, the time window of the second network device may be 11:00 PM to 8:00 AM. Thus, the second network device may determine that the length of time is within the time window of the second network device, and, as a result, agree to disable the link for the length of time. In this example, the length of time is equal to the other candidate length of time. In other examples (e.g., in a case where the time window of the second network device ends before the time window of the first network device), the length of time may be less than the candidate length of time. Furthermore, in this example, the first and second network devices are in the same time zone. In other examples, the first and second network devices may be in different time zones. The first and second network devices may negotiate a length of time to disable the link for regardless of whether the first and second network devices share a time zone.

The time windows of the first network device and the second network device may overlap with each other for the length of time for which the link is to remain disabled. For example, the time window of the first network device (e.g., 10:00 PM to 6:00 AM) and the time window of the second network device (e.g., 11:00 PM to 8:00 AM) may overlap from 11:00 PM to 6:00 AM, which is seven hours (which is equal to the length of time). Thus, the first and second network devices may determine the common time slot (e.g., the period of overlap) of the first and second network devices for the link. In this example, because the common time slot is 11:00 PM to 6:00 AM, the first and second network devices may disable the link at 11:00 PM and avoid raising an alarm for the link until 6:00 AM.

As shown by reference numbers 130 and 140, the first and second network devices power off one or more components associated with the link based on the indication to disable the link for the length of time. For example, the first network device may power off one or more components local to the first network device, and the second network device may power off one or more components local to the second network device. The one or more components may include optics that are associated with the link (e.g., optics that the first and second network devices use to transmit network traffic over the link). The first and second network devices power off the one or more components for the length of time. Additionally, or alternatively, the first and/or second network devices may power off other components based on the reduced load experienced by the first and/or second network devices while the link is disabled. The other components may include power supply modules (PSMs), SIBs, ASICs, PFE-fabric links internal to the first and/or second network devices, or the like.

Powering off the one or more components based on the indication to disable the link for the length of time may switch off (e.g., disable) the link (and/or the attached optics) for the length of time, causing the link to enter a power nap state. As a result, the network device may reduce power consumption associated with the link. Although example implementation 100 applies to a single link, any suitable quantity of network devices may follow example implementation 100 to disable multiple links in a network (e.g., in aggregated ethernet (AE) or equal cost multi-path (ECMP) scenarios), which may compound power reduction. For example, various network devices may, automatically and based on mutual agreement, switch off multiple links for specified durations during low-load, off-peak hours/periods (e.g., time windows). Thus, multiple network devices may power off components for multiple links, which may reduce power consumption and thereby lower electricity costs and the carbon footprint of network operators.

Furthermore, powering off the one or more components based on the indication to disable the link for the length of time may be operator-independent. For example, the first and second network devices may shut down the link (e.g., enter a power nap state) based on mutual agreement (e.g., the request and the indication) between the first and second network devices, even if the first and second network devices are controlled by different operators and/or different control points. The request and the indication may enable the first and second network devices determine that the power nap is a controlled (e.g., planned, expected, or the like) shutdown of the link, rather than a fault. As a result, neither network device raises a link fault alarm during the length of time when the optics are powered off and the link remains down, thereby preventing false alarms during the length of time. Because the request and/or indication are to disable the link for the length of time, the first and second network devices may power off the one or more components even if the clocks of the first and second network devices are not synchronized.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

FIG. 2 is a diagram of an example implementation 200 associated with a network device powering off components based on the indication to disable the link for the length of time. The network device may be the first or second network device.

Because switching off the link reduces the load experienced by the network device, the network device may power off various components (e.g., in addition to the optics associated with the link). For example, the link power nap may reduce the bandwidth requirement of the chassis associated with the network device and allow other in-network-device actions. For example, as shown, the network device may power off a subset of hardware components, such as switch interconnect boards (SIBs) (e.g., SIB3 and SIB4), PSMs (e.g., PSM 3-PSM N), PFE-fabric links internal to the network device, or the like. Powering off these components may provide additional power savings (e.g., beyond the power savings afforded by switching off the link).

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
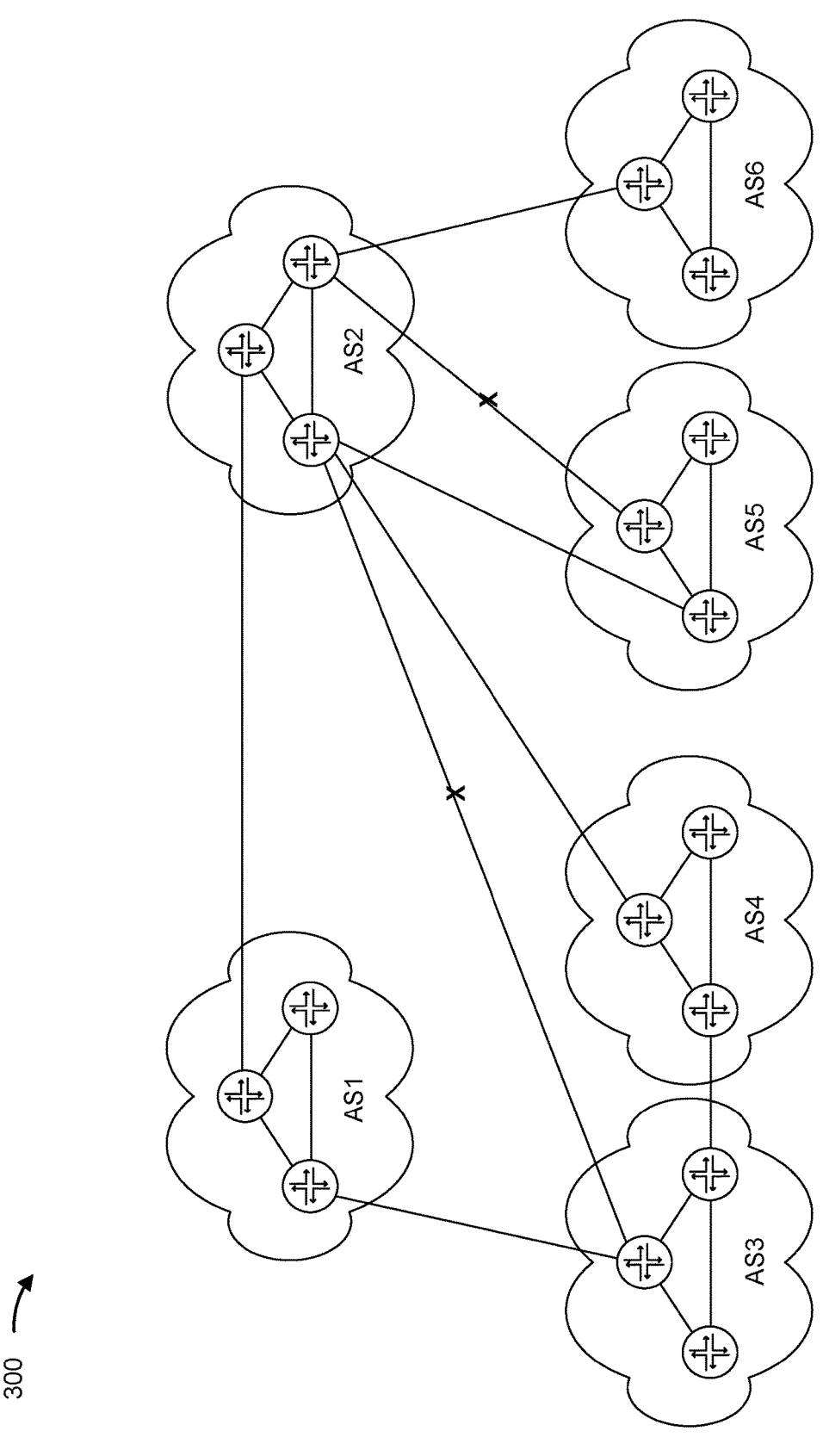
FIG. 3 is a diagram of an example implementation associated with multiple networks controlled by respective operators.

FIG. 3 is a diagram of an example implementation 300 associated with multiple networks controlled by respective operators. As shown, multiple links (e.g., paths) exist between the networks (e.g., ASs). As shown, AS2 and AS5 are connected by two links, one of which may be shut off during off-peak hours. The link between AS2 and AS3 may also be shut off during off-peak hours. In this example, network traffic may continue to flow between AS2 and AS3 during off-peak hours via AS1 and/or AS4. The network devices associated with the links may shut off the links as described above in connection with FIG. 1.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
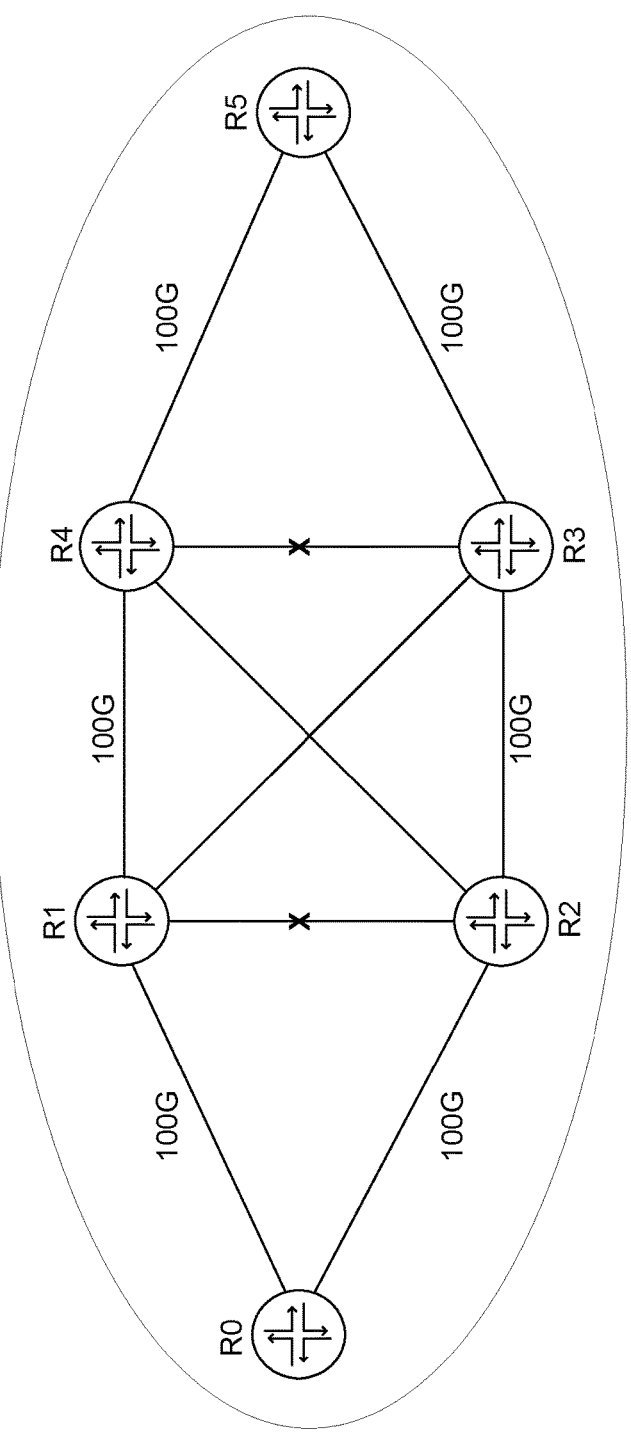
FIG. 4 is a diagram of an example implementation associated with a network controlled by a single operator.

FIG. 4 is a diagram of an example implementation 400 associated with a network controlled by a single operator. The network contains network devices (e.g., routers) R0-R5 and multiple alternative links (e.g., paths) between the routers. As shown, routers R1 and R2, and routers R3 and R4, may power off associated links during low traffic load. The routers R1-R4 may power off the links as described above in connection with FIG. 1.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

Figure 5:
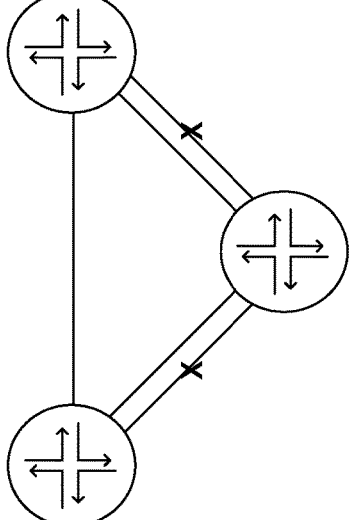

FIG. 5 is a diagram of an example implementation 500 associated with aggregated links. For example, the aggregated links may be aggregated as a link aggregation group (LAG), AE (e.g., MC-AE), a MC-LAG, or the like. As shown, network devices may power off one or more child (or member) links, of an aggregated link, during low traffic load. For example, AE bundles may contain multiple child links, one or more of which may be powered off. The network devices may power off the child or member links as described above in connection with FIG. 1.

As indicated above, FIG. 5 is provided as an example. Other examples may differ from what is described with regard to FIG. 5. The number and arrangement of devices shown in FIG. 5 are provided as an example. In practice, there may be additional devices, fewer devices, different devices, or differently arranged devices than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) shown in FIG. 5 may perform one or more functions described as being performed by another set of devices shown in FIG. 5.

Figure 6:
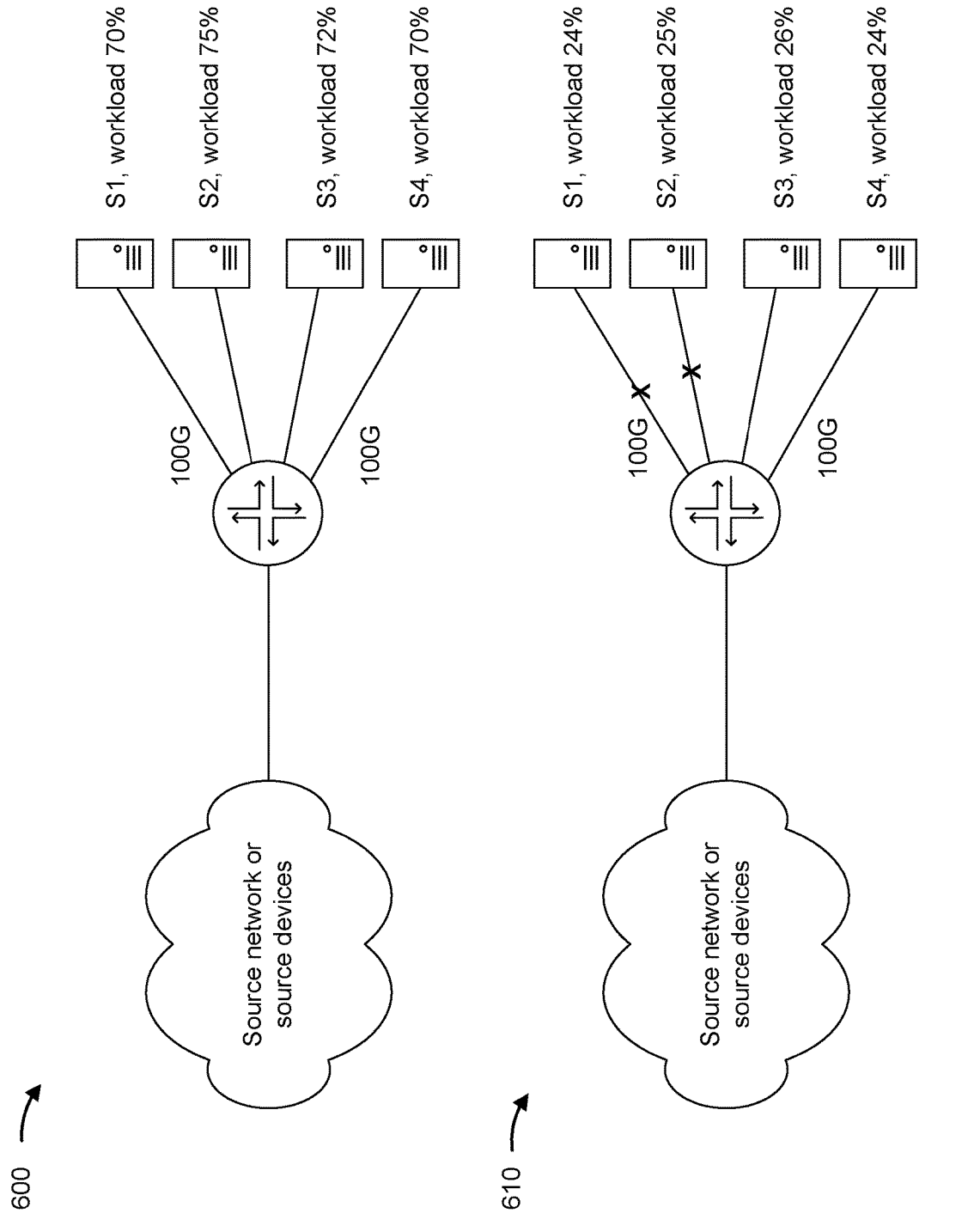
FIG. 6 is a diagram of example implementations associated with multiple servers.

FIG. 6 is a diagram of example implementations 600 and 610 associated with multiple servers S1-S4. In example implementations 600 and 610, a router or a load balancer routes traffic to the servers S1-S4 over respective links. For example, the router or load balancer may manage load distributions to the servers S1-S4 using ECMP routing, weighted ECMP (WECMP) routing, server load balancing, or the like. Example implementation 600 shows a relatively high workload during peak hours, and example implementation 610 shows a relatively low workload during off-peak hours. As shown in example implementation 610, links associated with servers S1 and S2 are powered off. The router or load balancer and servers S1 and S2 may power off the links as described above in connection with FIG. 1. In addition to reducing power consumption by powering off specific components associated with the links, the power consumption may be further reduced in this example by enabling the servers S1 and S2 to go to sleep.

As indicated above, FIG. 6 is provided as an example. Other examples may differ from what is described with regard to FIG. 6. The number and arrangement of devices shown in FIG. 6 are provided as an example. In practice, there may be additional devices, fewer devices, different devices, or differently arranged devices than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) shown in FIG. 6 may perform one or more functions described as being performed by another set of devices shown in FIG. 6.

In some aspects, the request to disable the link for the candidate length of time may be an LLDP TLV request, and the indication to disable the link for the length of time may be an LLDP TLV acknowledgement. For example, the request and acknowledgement may be carried in reserved LLDP TLVs (as described below in connection with FIG. 7) or organizationally specific TLVs with subtypes (as described below in connection with FIG. 8). As shown in Table 1 below, reserved LLDP TLVs may have TLV type values 9-126, and organizationally specific TLVs may have TLV type value 127 (TLVs with type values 0-8 may be members of a basic management set).

TABLE 1

| TLV type | TLV name | Usage in LLDP Data Unit |
|---|---|---|
| 0 | End Of LLDP Data Unit | Optional |
| 1 | Chassis Identifier | Mandatory |
| 2 | Port Identifier | Mandatory |
| 3 | Time To Live | Mandatory |
| 4 | Port Description | Optional |
| 5 | System Name | Optional |
| 6 | System Description | Optional |
| 7 | System Capabilities | Optional |
| 8 | Management Address | Optional |
| 9-126 | Reserved for future standardization | — |
| 127 | Organizationally Specific TLVs | Optional |

In some aspects, a value associated with the LLDP TLV request may be the candidate length of time, and a value associated with the LLDP TLV acknowledgement may be the length of time. For example, as described below in connection with FIGS. 7 and 8, the LLDP TLV request may carry the candidate length of time, and the LLDP TLV acknowledgement may carry the length of time. In some aspects, a rejection associated with the request to disable the link for the candidate length of time may be an LLDP TLV acknowledgement, and a value associated with the LLDP TLV acknowledgement may be zero. For example, as described below in connection with FIGS. 7 and 8, the LLDP TLV acknowledgement (e.g., rejection) may carry a value of zero, which may indicate that the length of time for which the link is to be powered off based on that LLDP TLV acknowledgement is zero.

The request to disable the link for the candidate length of time being an LLDP TLV request, and the indication to disable the link for the length of time being an LLDP TLV acknowledgement, may reduce introduction of additional overhead. For example, the LLDP TLVs may be sent with LLDP messages without creating additional PDUs. LLDP, an L2 protocol, may be well-suited to carry out the hand-shake between network devices.

Figure 7:
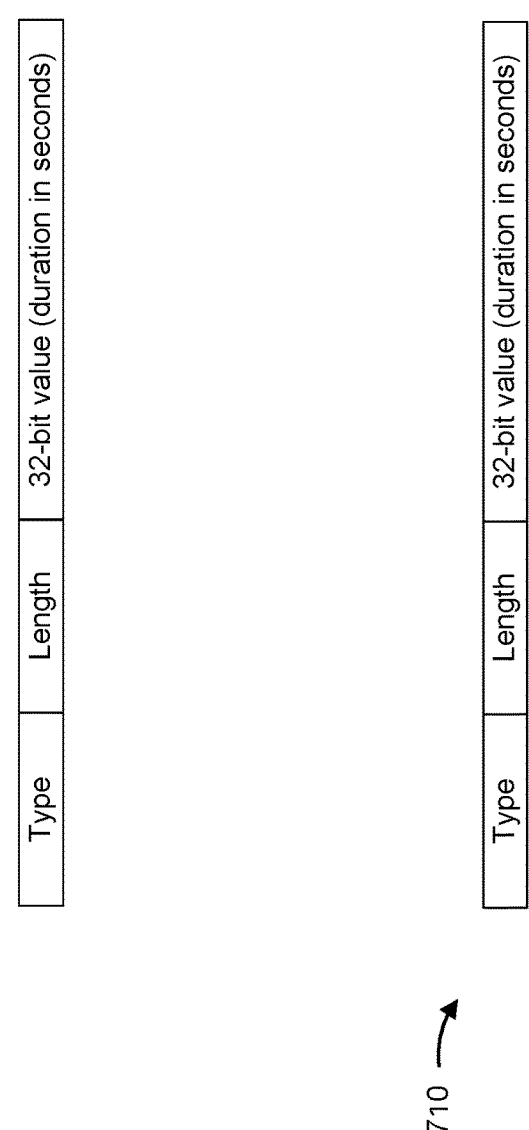
FIG. 7 is a diagram of an example implementations associated with reserved link layer discovery protocol (LLDP) type-length-values (TLVs).

FIG. 7 is a diagram of an example implementations 700 and 710 associated with reserved LLDP TLVs. Example implementation 700 shows an LLDP TLV request that contains a type field, a length field, and a value field. The type field may indicate type 9, for example. The value field may contain a 32-bit value that indicates the length of time (e.g., in seconds) for which the initiator network device proposes to allow the link to remain in a power nap state.

Example implementation 710 shows an LLDP TLV acknowledgement that contains a type field, a length field, and a value field. The type field may indicate type 10, for example. The value field may contain a 32-bit value that indicates the length of time for which the receiver network device allows the link to remain in a power nap state. For example, if the receiver network device accepts the LLDP TLV request, then the length of time may be equal to or less than the length of time proposed by the initiator network device. If the receiver network device rejects the LLDP TLV request, then the length of time may be zero.

As indicated above, FIG. 7 is provided as an example. Other examples may differ from what is described with regard to FIG. 7. The number and arrangement of devices shown in FIG. 7 are provided as an example. In practice, there may be additional devices, fewer devices, different devices, or differently arranged devices than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) shown in FIG. 7 may perform one or more functions described as being performed by another set of devices shown in FIG. 7.

Figure 8:
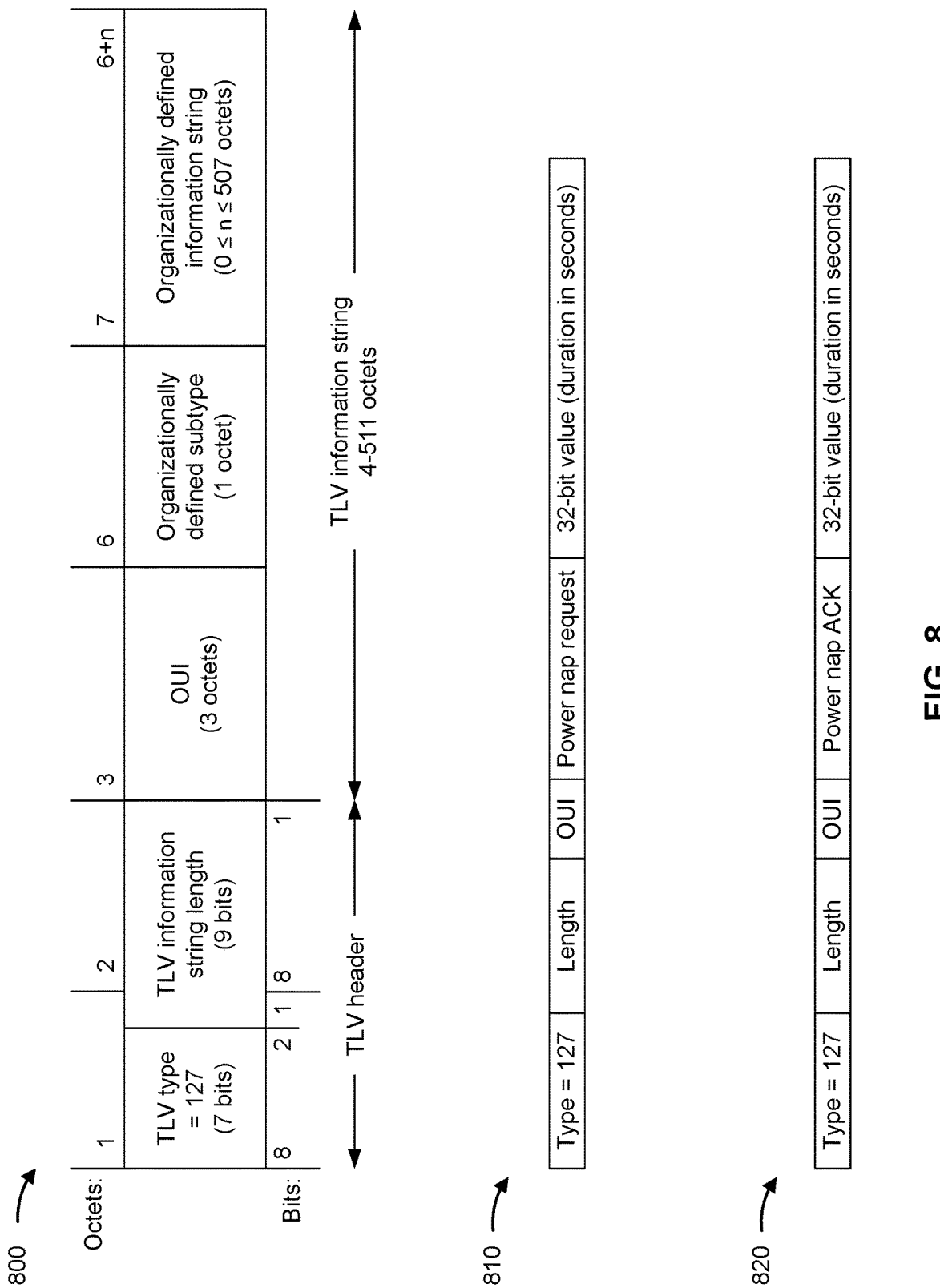
FIG. 8 is a diagram of example implementations associated with organizationally specific TLVs with subtypes.

FIG. 8 is a diagram of example implementations 800-820 associated with organizationally specific TLVs with sub-types. Example implementation 800 shows a basic format for organizationally specific TLVs. As shown, the basic format includes a TLV header and a TLV information string. The TLV header includes a TLV type field and a TLV information string length field. The TLV information string includes an organizationally unique identifier (OUI) field, an organizationally defined subtype field, and an organization-ally defined information string field.

Example implementation 810 shows an LLDP TLV request. The type field may indicate type 127, the organi-zationally defined subtype field may identify the LLDP TLV request as an LLDP TLV request, and the value field may contain a 32-bit value that indicates the length of time for which the initiator network device proposes to allow the link to remain in a power nap state.

Example implementation 820 shows an LLDP TLV acknowledgement. The type field may indicate type 127, the organizationally defined subtype field may identify the LLDP TLV request as an LLDP TLV acknowledgement, and the value field may contain a 32-bit value that indicates the length of time for which the receiver network device allows the link to remain in a power nap state. For example, if the receiver network device accepts the LLDP TLV request, then the length of time may be equal to or less than the length of time proposed by the initiator network device. If the receiver network device rejects the LLDP TLV request, then the length of time may be zero.

As indicated above, FIG. 8 is provided as an example. Other examples may differ from what is described with regard to FIG. 8. The number and arrangement of devices shown in FIG. 8 are provided as an example. In practice, there may be additional devices, fewer devices, different devices, or differently arranged devices than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) shown in FIG. 8 may perform one or more functions described as being performed by another set of devices shown in FIG. 8.

Figure 9A:
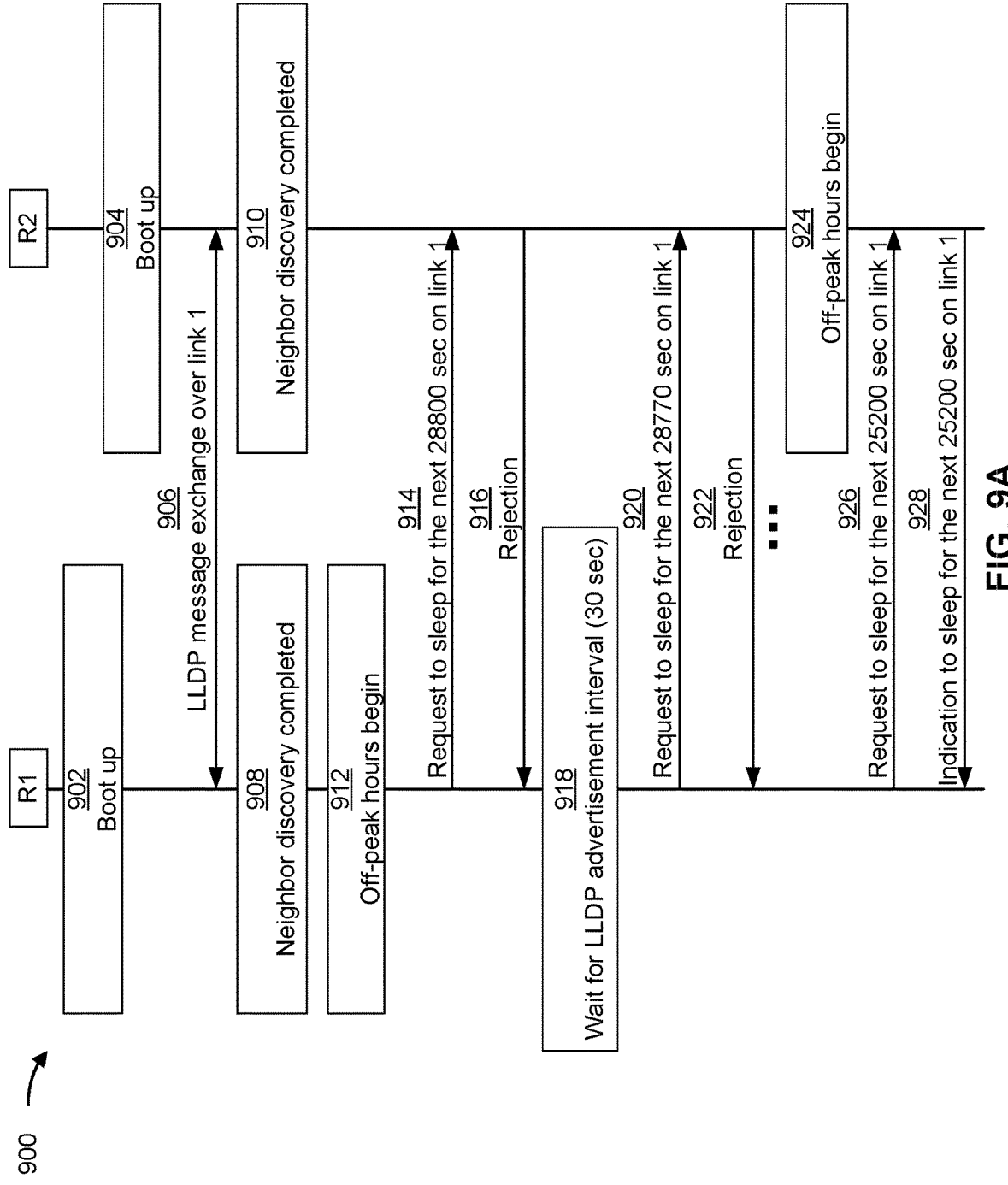
FIGS. 9A-9B are diagrams of an example implementation associated with a handshake to shut down a link between two routers.
Figure 9B:
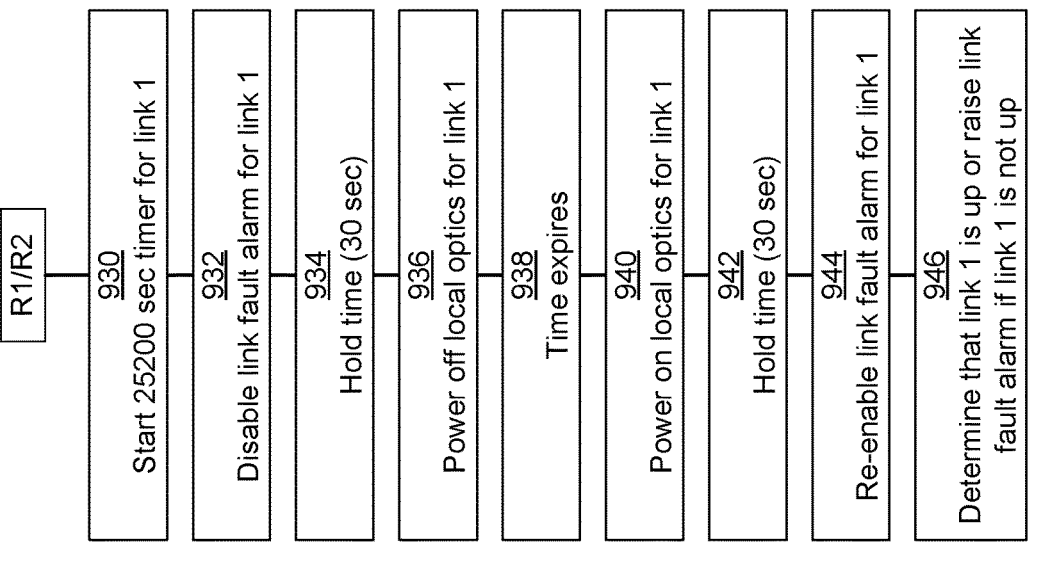

FIGS. 9A-9B are diagrams of an example implementation 900 associated with a handshake to shut down a link between a router R1 and a router R2.

With reference to FIG. 9A, as shown by reference number 902, R1 may boot up and identify a time window associated with off-peak hours. For example, R1 may boot up at 9:00 AM local time, and the time window may be from 10:00 PM to 6:00 AM. As shown by reference number 904, R2 may boot up and identify a time window associated with off-peak hours. For example, R2 may boot up at 10:30 AM local time, and the time window may be from 11:00 PM to 7:00 AM.

As shown by reference number 906, R1 and R2 may exchange LLDP messages over the link ("link 1"). R1 and R2 may exchange the LLDP messages to carry out neighbor discovery. As shown by reference number 908, R1 com-pletes neighbor discovery. As shown by reference number 910, R2 completes neighbor discovery.

As shown by reference number 912, the off-peak hours for R1 begin (e.g., the local time is 10:00 PM). As shown by reference number 914, R1 sends, to R2, a request to disable the link for a candidate length of time (e.g., 28,800 seconds, which is equal to eight hours, or the total time window for R1). As shown by reference number 916, R2 sends, to R1, a rejection associated with the request to disable the link for the candidate length of time. R2 may reject the request because the time window for R2 has not yet begun (e.g., the time is not yet 11:00 PM).

As shown by reference number 918, R1 waits for the LLDP advertisement interval (e.g., 30 seconds). As shown by reference number 920, R1 sends, to R2, another request to disable the link for another candidate length of time (e.g., 28,770 seconds, which is 30 seconds less than 28,800 seconds). As shown by reference number 922, R2 sends, to R1, another rejection associated with the other request to disable the link for the other candidate length of time. R2 may reject the other request because the time window for R2 has not yet begun (e.g., the time is not yet 11:00 PM). R1 and R2 may continue to exchange requests and rejections peri-odically (e.g., every 30 seconds).

As shown by reference number 924, the off-peak hours for R2 begin (e.g., the local time is 11:00 PM). As shown by reference number 926, R1 sends, to R2, a request to disable the link for a candidate length of time (e.g., 25,200 seconds, which is equal to seven hours, or the overlap between the time windows). As shown by reference number 928, R2 sends, to R1, an indication to disable the link for the candidate length of time.

FIG. 9B shows a set of operations performed by R1 and/or R2 after the operations shown in FIG. 9A. In some examples, R1 and R2 may each perform the operations shown in FIG. 9B in parallel (e.g., each operation shown in FIG. 9B may occur at both R1 and R2 at the same time or within a time threshold).

As shown by reference number 930, R1/R2 may start a 25,200 second timer for the link ("link1-power-nap-R1" or "link1-power-nap-R2"). As shown by reference number 932, R1/R2 may disable a link fault alarm associated with the link. For example, R1/R2 may disable the link fault alarm for the duration of the 25,200 second timer. Disabling the link fault alarm may help to ensure that R1/R2 does not raise the link fault alarm when the link enters the power nap state.

As shown by reference number 934, R1/R2 waits for a hold time window (e.g., 30 seconds). In some examples, the hold time window may be user-configurable. As shown by reference number 936, R1/R2 powers off one or more components (e.g., local optics) associated with the link. In some aspects, R1/R2 may power off the one or more components the hold time window (e.g., 30 seconds) after disabling the link fault alarm. Powering off the one or more components the hold time window after disabling the link fault alarm may prevent R1/R2 from powering off one or more components before R2/R1 (e.g., the other router) is prepared for the link to enter the power nap state. Thus, powering off the one or more components the hold time window after disabling the link fault alarm may prevent R2/R1 from issuing a link fault alarm when the link is entering the power nap state.

As shown by reference number 938, the length of time (e.g., the 25,200 second timer) may expire. For example, the 25,200 second timer may expire at 6:00 AM local time. As shown by reference number 940, R1/R2 may power on the one or more components associated with the link based on the expiry of the length of time. For example, R1/R2 may power on the one or more components in response to the 25,200 second timer expiring. Powering on the one or more components associated with the link based on the expiry of the length of time may help to ensure that R1/R2 brings the link back online at the specified/agreed time.

As shown by reference number 942, R1/R2 waits for a hold time window (e.g., 30 seconds). In some examples, the hold time window may be user-configurable. As shown by reference number 944, R1/R2 may enable (e.g., re-enable) the link fault alarm. In some aspects, R1/R2 may enable the link fault alarm based on a hold time window. For example, R1/R2 may enable the link fault alarm the hold time window (e.g., 30 seconds) after powering on the one or more components. Enabling the link fault alarm may enable R1/R2 to raise the link fault alarm if the link does not come up after the length of time. Enabling the link fault alarm based on the hold time window may prevent R1/R2 from raising a link fault alarm before R2/R1 (e.g., the other router) has powered on components associated with the link (and, thus, returned the link from the power nap state to an active state).

As shown by reference number 946, R1/R2 may determine that the link is up or that the link is not up. For example, the link may have failed (e.g., due to a fiber cut or the like) during the length of time that the link was in the power nap state. If the link is not up, then R1/R2 may raise a link fault alarm.

In example implementation 900, R1 is the initiator network device and R2 is the receiver network device. However, in other examples, R1 and/or R2 may initiate a power nap (e.g., send an LLDP TLV request), and R1 and/or R2 may accept the power nap (e.g., send an LLDP TLV acknowledgement). Thus, R1 and R2 may act as initiator and/or receiver network devices. Any suitable operation that is described herein as being performed by an initiator network device may be performed by a receiver network device, and any suitable operation that is described herein as being performed by a receiver network device may be performed by an initiator network device.

Furthermore, for any suitable operation that is described herein as being performed by an initiator network device, a receiver network device may perform a corresponding operation. For example, if the initiator network device transmits or receives a transmission, then the receiver network device may receive or transmit the transmission. Similarly, for any suitable operation that is described herein as being performed by a receiver network device, an initiator network device may perform a corresponding operation. For example, if the receiver network device transmits or receives a transmission, then the initiator network device may receive or transmit the transmission.

Specific values of various timers, time windows, or the like disclosed in example implementation 900 are used for the sake of example and may differ depending on particular use cases. In some examples, a network operator may configure one or more of the values. For example, the hold time window may be 30 seconds or any suitable value set by the network operator.

As indicated above, FIGS. 9A-9B are provided as an example. Other examples may differ from what is described with regard to FIGS. 9A-9B. The number and arrangement of devices shown in FIGS. 9A-9B are provided as an example. In practice, there may be additional devices, fewer devices, different devices, or differently arranged devices than those shown in FIGS. 9A-9B. Furthermore, two or more devices shown in FIGS. 9A-9B may be implemented within a single device, or a single device shown in FIGS. 9A-9B may be implemented as multiple, distributed devices. Additionally, or alternatively, a set of devices (e.g., one or more devices) shown in FIGS. 9A-9B may perform one or more functions described as being performed by another set of devices shown in FIGS. 9A-9B.

Figure 10:
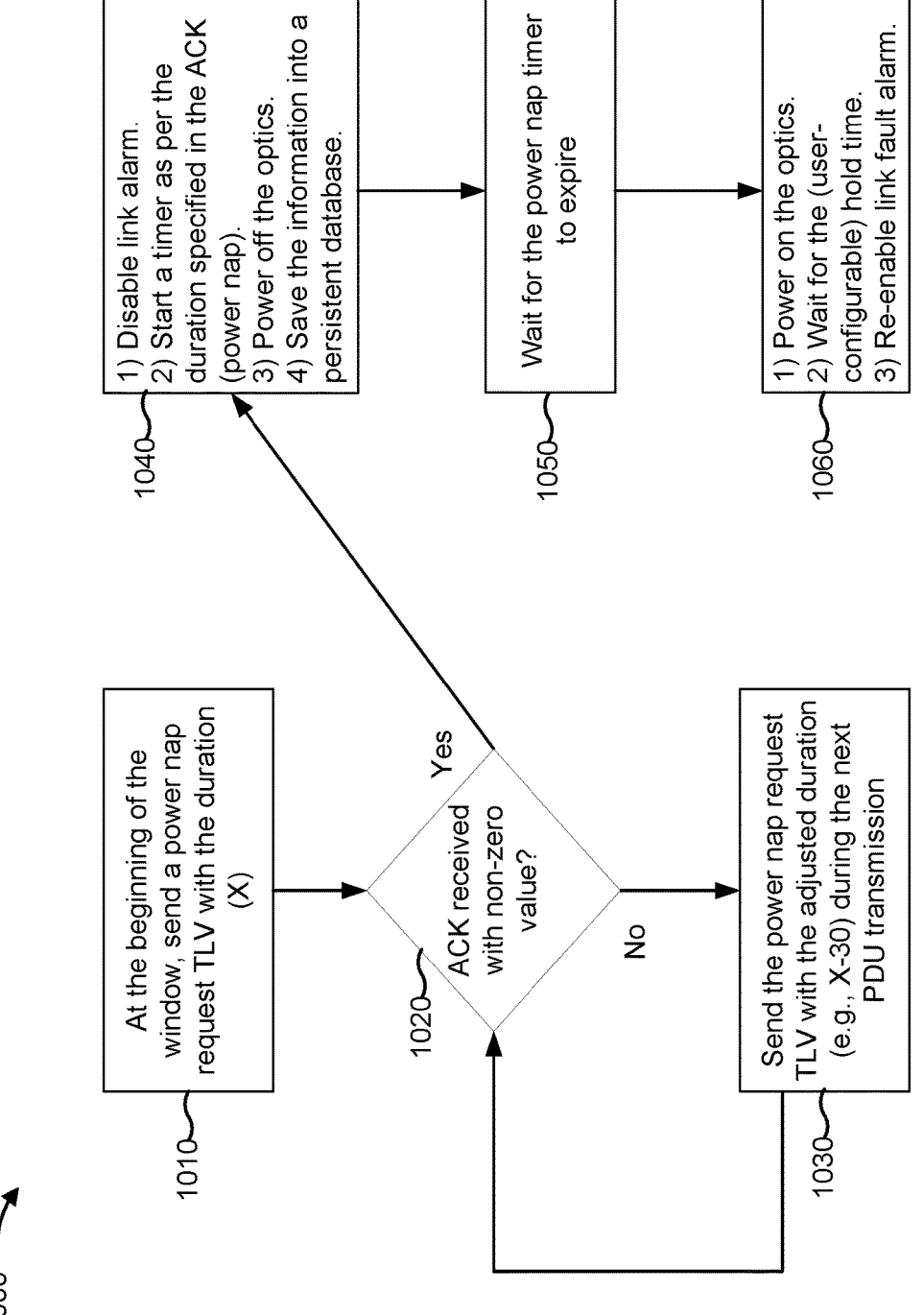
FIG. 10 is a diagram of an example implementation associated with an initiator network device.

FIG. 10 is a diagram of an example implementation 1000 associated with an initiator (e.g., requester) network device.

As shown by reference number 1010, the initiator network device may send a power nap request TLV with a given duration (e.g., a candidate length of time) X. As shown by reference number 1020, the initiator network device may determine whether an acknowledgement ("ACK") was received with a non-zero value. As shown by reference number 1030, if the initiator network device did not receive an acknowledgement with a non-zero value, then the initiator network device may send the power nap request TLV with an adjusted duration (e.g., another candidate length of time, such as X−30) during the next PDU transmission. The initiator network device may repeat the operations corresponding to reference numbers 1020 and 1030 until the adjusted duration X reaches zero or an ACK with a non-zero value arrives from the receiver network device.

As shown by reference number 1040, if the initiator network device did receive an acknowledgement with a non-zero value, then the initiator network device may perform multiple operations. In some examples, the initiator network device may disable a link fault alarm. In some examples, the initiator network device may start a timer (e.g., a power nap timer) according to the duration specified in the acknowledgement (e.g., the length of the timer may be the non-zero value). In some examples, the initiator network device may power off optics associated with the link.

In some aspects, the initiator network device may store information (e.g., power-nap-related information) associated with the link in persistent storage (e.g., a persistent database). The information may include one or more of an indication of the link (e.g., a link name), an indication of a start time associated with the length of time (e.g., start time of the power nap), an indication of the length of time (e.g., a duration), or an indication of an alarm associated with the link (e.g., any pre-existing link alarms). In some examples, the initiator network device may store the information at the beginning of the power nap for the link.

Storing one or more of the indication of the link, the indication of a start time associated with the length of time, the indication of the length of time, or the indication of the link fault alarm associated with the link may help to avoid the initiator network device from raising a link fault alarm in high availability (HA) scenarios. For example, in the event that the initiator network device reboots during the power nap or a software module running the timer crashes, instead of the initiator network device losing the information, restarting, and generating a link fault alarm in response to the link being disabled, a software module responsible for power nap and interface management may read this information during every bootup/reboot/start and use the information to restore the state of the link without raising a link fault alarm associated with the link.

As shown by reference number 1050, the initiator network device may wait for the timer to expire. As shown by reference number 1060, the initiator network device may perform multiple operations. In some examples, the initiator network device may power on the optics. In some examples, the initiator network device may wait for the hold time window to elapse. In some examples, the initiator network device may re-enable the link fault alarm.

As indicated above, FIG. 10 is provided as an example. Other examples may differ from what is described with regard to FIG. 10. The number and arrangement of devices shown in FIG. 10 are provided as an example. In practice, there may be additional devices, fewer devices, different devices, or differently arranged devices than those shown in FIG. 10. Furthermore, two or more devices shown in FIG. 10 may be implemented within a single device, or a single device shown in FIG. 10 may be implemented as multiple, distributed devices. Additionally, or alternatively, a set of devices (e.g., one or more devices) shown in FIG. 10 may perform one or more functions described as being performed by another set of devices shown in FIG. 10.

FIG. 11 is a diagram of an example implementation 1100 associated with a receiver network device.

As shown by reference number 1110, the receiver network device may receive a power nap request TLV with a given duration (e.g., a candidate length of time) X. As shown by reference number 1120, the receiver network device may determine whether the receiver network device is ready for the link to sleep (e.g., whether the receiver network device is in off-peak hours) based on the configuration or policy of the receiver network device. As shown by reference number 1130, if the receiver network device is not ready for the link to sleep, then the receiver network device may ignore the TLV or send an acknowledgement containing a length of time (e.g., power nap duration) value of zero.

As shown by reference number 1140, if the receiver network device is ready for the link to sleep, then the receiver network device sends, and the initiator network device receives, an acknowledgement TLV (e.g., containing a non-zero length of time representing an appropriate time duration). In some examples, the receiver network device may disable a link fault alarm. In some examples, the receiver network device may start a timer (e.g., a power nap timer) according to the duration specified in the acknowledgement (e.g., the length of the timer may be the non-zero length of time). In some examples, the receiver network device may power off optics associated with the link. In some aspects, the receiver network device may store information associated with the link in persistent storage, as described above in connection with FIG. 10.

As shown by reference number 1150, the receiver network device may wait for the timer to expire. As shown by reference number 1160, the receiver network device may perform multiple operations. In some examples, the receiver network device may power on the optics. In some examples, the receiver network device may wait for the hold time window to elapse. In some examples, the receiver network device may re-enable the link fault alarm.

As indicated above, FIG. 11 is provided as an example. Other examples may differ from what is described with regard to FIG. 11. The number and arrangement of devices shown in FIG. 11 are provided as an example. In practice, there may be additional devices, fewer devices, different devices, or differently arranged devices than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) shown in FIG. 11 may perform one or more functions described as being performed by another set of devices shown in FIG. 11.

Figure 12:
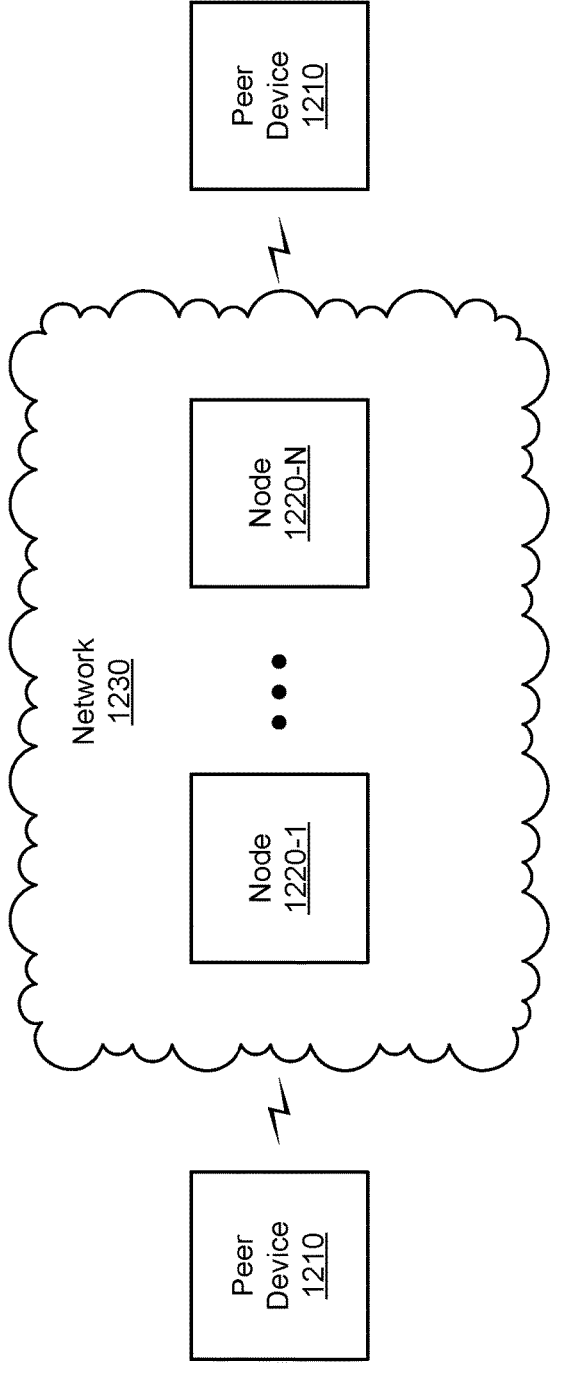
FIG. 12 is a diagram of an example environment in which systems and/or methods described herein may be implemented.

FIG. 12 is a diagram of an example environment 1200 in which systems and/or methods described herein may be implemented. As shown in FIG. 12, environment 1200 may include one or more peer devices 1210, a group of nodes 1220 (shown as node 1220-1 through node 1220-N), and a network 1230. Devices of environment 1200 may interconnect via wired connections, wireless connections, or a combination of wired and wireless connections.

Peer device 1210 includes one or more devices capable of receiving and/or providing network traffic. For example, peer device 1210 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. In some implementations, peer device 1210 may include an endpoint device that is a source or a destination for network traffic. For example, peer device 1210 may include a computer or a similar type of device. Peer device 1210 may receive network traffic from and/or may provide network traffic (e.g., payload packets) to other peer devices 1210 via network 1230 (e.g., by routing payload packets using node(s) 1220 as an intermediary). In some implementations, peer device 1210 may include an edge device that is located at an edge of one or more networks. For example, peer device 1210 receive network traffic from and/or may provide network traffic (e.g., payload packets) to devices external to network 1230.

Node 1220 includes one or more devices capable of receiving, processing, storing, routing, and/or providing traffic (e.g., a payload packet, a file, etc.) in a manner described herein. For example, node 1220 may include a router, such as a label switching router (LSR), a label edge router (LER), an ingress router, an egress router, a provider router (e.g., a provider edge router, a provider core router, etc.), a virtual router, or another type of router. Additionally, or alternatively, node 1220 may include a gateway, a switch, a firewall, a hub, a bridge, a reverse proxy, a server (e.g., a proxy server, a cloud server, a data center server, etc.), a load balancer, and/or a similar device.

In some implementations, node 1220 may be a physical device implemented within a housing, such as a chassis. In some implementations, node 1220 may be a virtual device implemented by one or more computer devices of a cloud computing environment or a data center.

In some implementations, node 1220 may be configured with one or more segment translation tables. In some implementations, node 1220 may receive a payload packet from peer device 1210. In some implementations, node 1220 may encapsulate the payload packet using a compressed routing header (CRH) and may route the internet protocol (IP) payload packet to another node 1220, using one or more techniques described elsewhere herein. In some implementations, node 1220 may be an edge node in network 1230. In some implementations, node 1220 may be an intermediary node in network 1230 (i.e., a node between two or more edge nodes).

Network 1230 includes one or more wired and/or wireless networks. For example, network 1230 may include a cellular network (e.g., a fifth generation (5G) network, a fourth generation (4G) network, such as a long-term evolution (LTE) network, a third generation (3G) network, a code division multiple access (CDMA) network, or a public land mobile network (PLMN)), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 12 are provided as one or more examples. In practice, there may be additional devices and/or networks, fewer devices and/or networks, different devices and/or networks, or differently arranged devices and/or networks than those shown in FIG. 12. Furthermore, two or more devices shown in FIG. 12 may be implemented within a single device, or a single device shown in FIG. 12 may be implemented as multiple, distributed devices. Additionally, or alternatively, a set of devices (e.g., one or more devices) of environment 1200 may perform one or more functions described as being performed by another set of devices of environment 1200.

Figure 13:
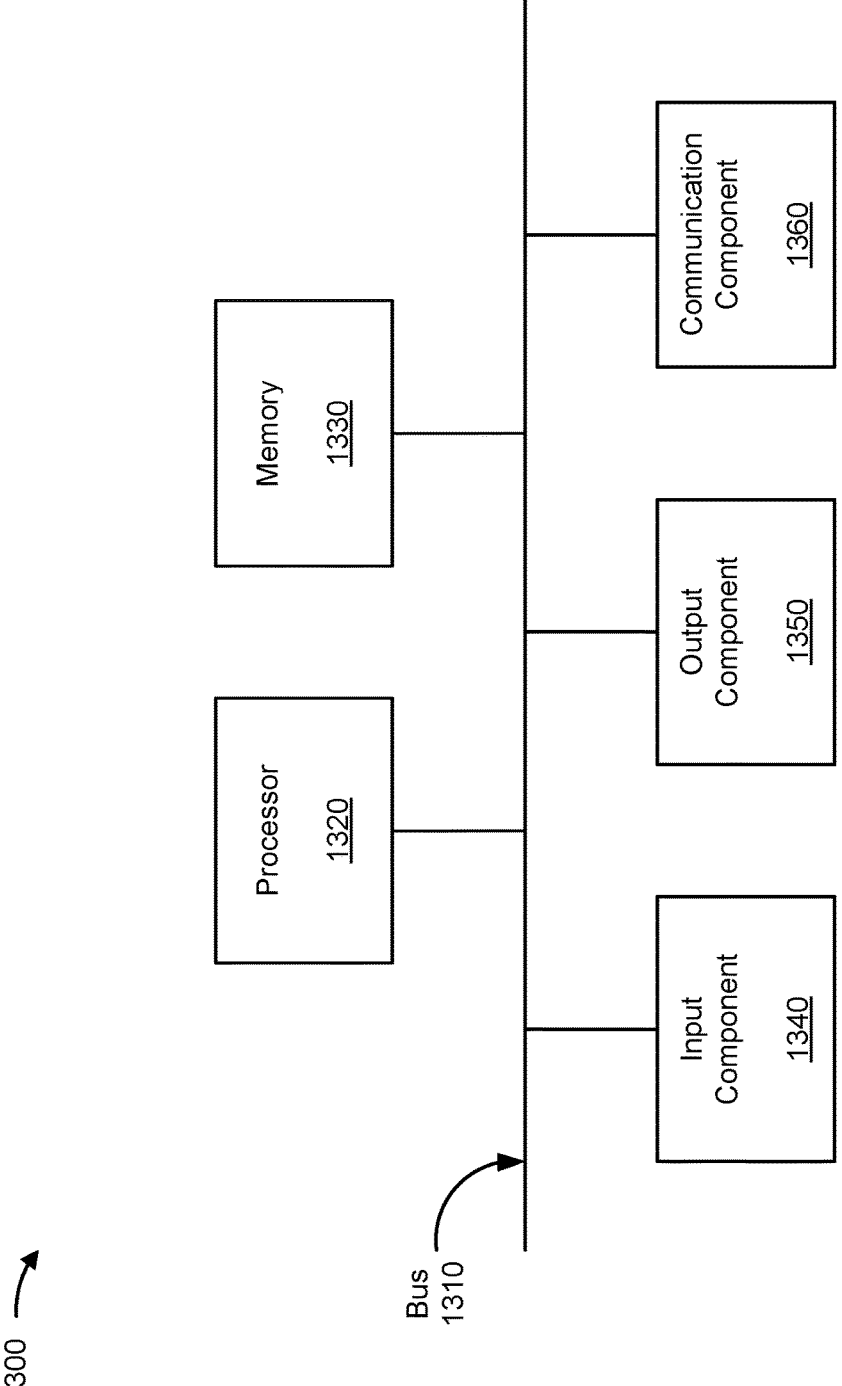
FIG. 13 is a diagram of example components of a device associated with disabling a link for a length of time.

FIG. 13 is a diagram of example components of a device 1300 associated with disabling a link for a length of time. The device 1300 may correspond to peer device 1210. In some implementations, peer device 1210 may include one or more devices 1300 and/or one or more components of the device 1300. As shown in FIG. 13, the device 1300 may include a bus 1310, a processor 1320, a memory 1330, an input component 1340, an output component 1350, and/or a communication component 1360.

The bus 1310 may include one or more components that enable wired and/or wireless communication among the components of the device 1300. The bus 1310 may couple together two or more components of FIG. 13, such as via operative coupling, communicative coupling, electronic coupling, and/or electric coupling. For example, the bus 1310 may include an electrical connection (e.g., a wire, a trace, and/or a lead) and/or a wireless bus. The processor 1320 may include a central processing unit, a graphics processing unit, a microprocessor, a controller, a microcontroller, a digital signal processor, a field-programmable gate array, an application-specific integrated circuit, and/or another type of processing component. The processor 1320 may be implemented in hardware, firmware, or a combination of hardware and software. In some implementations, the processor 1320 may include one or more processors capable of being programmed to perform one or more operations or processes described elsewhere herein.

The memory 1330 may include volatile and/or nonvolatile memory. For example, the memory 1330 may include random access memory (RAM), read only memory (ROM), a hard disk drive, and/or another type of memory (e.g., a flash memory, a magnetic memory, and/or an optical memory).

The memory 1330 may include internal memory (e.g., RAM, ROM, or a hard disk drive) and/or removable memory (e.g., removable via a universal serial bus connection). The memory 1330 may be a non-transitory computer-readable medium. The memory 1330 may store information, one or more instructions, and/or software (e.g., one or more software applications) related to the operation of the device 1300. In some implementations, the memory 1330 may include one or more memories that are coupled (e.g., communicatively coupled) to one or more processors (e.g., processor 1320), such as via the bus 1310. Communicative coupling between a processor 1320 and a memory 1330 may enable the processor 1320 to read and/or process information stored in the memory 1330 and/or to store information in the memory 1330.

The input component 1340 may enable the device 1300 to receive input, such as user input and/or sensed input. For example, the input component 1340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 1350 may enable the device 1300 to provide output, such as via a display, a speaker, and/or a light-emitting diode. The communication component 1360 may enable the device 1300 to communicate with other devices via a wired connection and/or a wireless connection. For example, the communication component 1360 may include a receiver, a transmitter, a transceiver, a modem, a network interface card, and/or an antenna.

The device 1300 may perform one or more operations or processes described herein. For example, a non-transitory computer-readable medium (e.g., memory 1330) may store a set of instructions (e.g., one or more instructions or code) for execution by the processor 1320. The processor 1320 may execute the set of instructions to perform one or more operations or processes described herein. In some implementations, execution of the set of instructions, by one or more processors 1320, causes the one or more processors 1320 and/or the device 1300 to perform one or more operations or processes described herein. In some implementations, hardwired circuitry may be used instead of or in combination with the instructions to perform one or more operations or processes described herein. Additionally, or alternatively, the processor 1320 may be configured to perform one or more operations or processes described herein. Thus, implementations described herein are not limited to any specific combination of hardware circuitry and software.

The number and arrangement of components shown in FIG. 13 are provided as an example. The device 1300 may include additional components, fewer components, different components, or differently arranged components than those shown in FIG. 13. Additionally, or alternatively, a set of components (e.g., one or more components) of the device 1300 may perform one or more functions described as being performed by another set of components of the device 1300.

Figure 14:
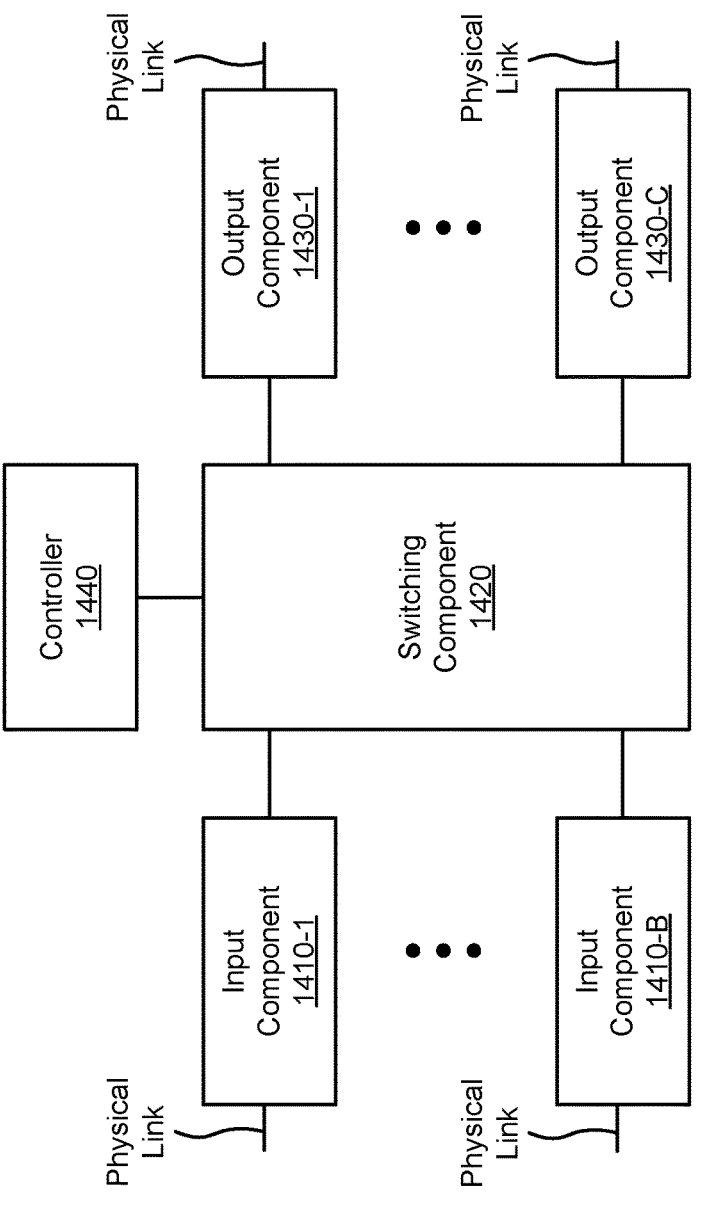
FIG. 14 is a diagram of example components of a device associated with disabling a link for a length of time.

FIG. 14 is a diagram of example components of a device 1400 associated with disabling a link for a length of time. Device 1400 may correspond to peer device 1210. In some implementations, peer device 1210 may include one or more devices 1400 and/or one or more components of device 1400. As shown in FIG. 14, device 1400 may include one or more input components 1410-1 through 1410-B (B≥1) (hereinafter referred to collectively as input components 1410, and individually as input component 1410), a switching and/or routing component 1420, one or more output components 1430-1 through 1430-C(C≥1) (hereinafter referred to collectively as output components 1430, and individually as output component 1430), and a controller 1440.

Input component 1410 may be one or more points of attachment for physical links and may be one or more points of entry for incoming traffic, such as packets. Input component 1410 may process incoming traffic, such as by performing data link layer encapsulation or decapsulation. In some implementations, input component 1410 may transmit and/or receive packets. In some implementations, input component 1410 may include an input line card that includes one or more packet processing components (e.g., in the form of integrated circuits), such as one or more interface cards (IFCs), packet forwarding components, line card controller components, input ports, processors, memories, and/or input queues. In some implementations, device 1400 may include one or more input components 1410.

Switching and/or routing component 1420 may interconnect input components 1410 with output components 1430. In some implementations, switching and/or routing component 1420 may be implemented via one or more crossbars, via busses, and/or with shared memories. The shared memories may act as temporary buffers to store packets from input components 1410 before the packets are eventually scheduled for delivery to output components 1430. In some implementations, switching and/or routing component 1420 may enable input components 1410, output components 1430, and/or controller 1440 to communicate with one another.

Output component 1430 may store packets and may schedule packets for transmission on output physical links. Output component 1430 may support data link layer encapsulation or decapsulation, and/or a variety of higher-level protocols. In some implementations, output component 1430 may transmit packets and/or receive packets. In some implementations, output component 1430 may include an output line card that includes one or more packet processing components (e.g., in the form of integrated circuits), such as one or more IFCs, packet forwarding components, line card controller components, output ports, processors, memories, and/or output queues. In some implementations, device 1400 may include one or more output components 1430. In some implementations, input component 1410 and output component 1430 may be implemented by the same set of components (e.g., and input/output component may be a combination of input component 1410 and output component 1430).

Controller 1440 includes a processor in the form of, for example, a central processing unit (CPU), a graphics processing unit (GPU), an accelerated processing unit (APU), a microprocessor, a microcontroller, a digital signal processor (DSP), an field-programmable gate array (FPGA), an ASIC, and/or another type of processor. The processor is implemented in hardware, firmware, or a combination of hardware and software. In some implementations, controller 1440 may include one or more processors that can be programmed to perform a function.

In some implementations, controller 1440 may include a RAM, a ROM, and/or another type of dynamic or static storage device (e.g., a flash memory, a magnetic memory, an optical memory, etc.) that stores information and/or instructions for use by controller 1440.

In some implementations, controller 1440 may communicate with other devices, networks, and/or systems connected to device 1400 to exchange information regarding network topology. Controller 1440 may create routing tables based on the network topology information, may create forwarding tables based on the routing tables, and may forward the forwarding tables to input components 1410 and/or output components 1430. Input components 1410 and/or output components 1430 may use the forwarding tables to perform route lookups for incoming and/or outgoing packets.

Controller 1440 may perform one or more processes described herein. Controller 1440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 1440 from another computer-readable medium or from another device via a communication interface. When executed, software instructions stored in a memory and/or storage component associated with controller 1440 may cause controller 1440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 14 are provided as an example. In practice, device 1400 may include additional components, fewer components, different components, or differently arranged components than those shown in FIG. 14. Additionally, or alternatively, a set of components (e.g., one or more components) of device 1400 may perform one or more functions described as being performed by another set of components of device 1400.

Figure 15:
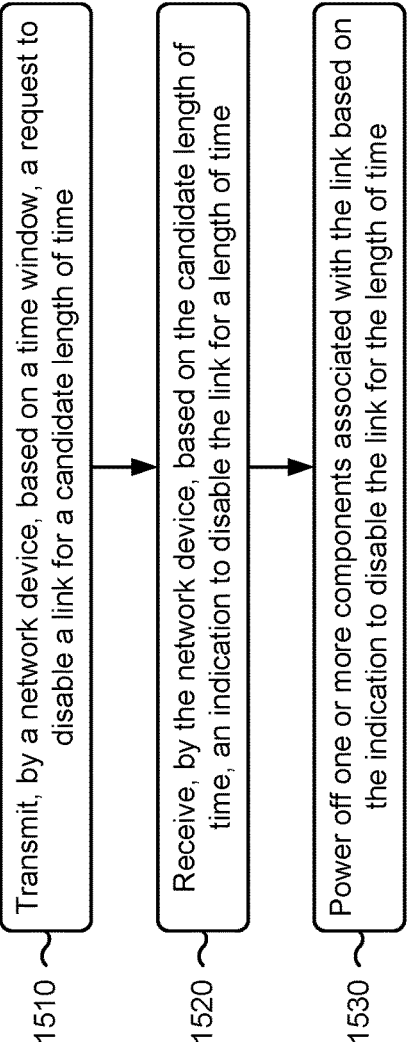
FIG. 15 is a flowchart of an example process associated with disabling a link for a length of time.

FIG. 15 is a flowchart of an example process 1500 associated with disabling a link for a length of time. In some implementations, one or more process blocks of FIG. 15 are performed by a network device (e.g., the first network device shown in FIG. 1). In some implementations, one or more process blocks of FIG. 15 are performed by another device or a group of devices separate from or including the network device, such as a peer device (e.g., peer device 1210) and/or a node (e.g., node 1220). Additionally, or alternatively, one or more process blocks of FIG. 15 may be performed by one or more components of device 1300, such as processor 1320, memory 1330, input component 1340, output component 1350, communication component 1360, input component 1410, switching and/or routing component 1420, output component 1430, and/or controller 1440.

As shown in FIG. 15, process 1500 may include transmitting, based on a time window, a request to disable a link for a candidate length of time (block 1510). For example, the network device may transmit, based on a time window, a request to disable a link for a candidate length of time, as described above.

As further shown in FIG. 15, process 1500 may include receiving, based on the candidate length of time, an indication to disable the link for a length of time (block 1520). For example, the network device may receive, based on the candidate length of time, an indication to disable the link for a length of time, as described above.

As further shown in FIG. 15, process 1500 may include powering off one or more components associated with the link based on the indication to disable the link for the length of time (block 1530). For example, the network device may power off one or more components associated with the link based on the indication to disable the link for the length of time, as described above.

Process 1500 may include additional implementations, such as any single implementation or any combination of implementations described below and/or in connection with one or more other processes described elsewhere herein.

In a first implementation, the time window is associated with off-peak network traffic for the network device, another time window is associated with off-peak network traffic for another network device associated with the link, and the time window and the other time window overlap for the length of time.

In a second implementation, alone or in combination with the first implementation, process 1500 includes identifying, by the network device, the time window based on a policy.

In a third implementation, alone or in combination with one or more of the first and second implementations, process 1500 includes identifying, by the network device, the time window based on a configuration.

In a fourth implementation, alone or in combination with one or more of the first through third implementations, the request to disable the link for the candidate length of time is an LLDP TLV request, and the indication to disable the link for the length of time is an LLDP TLV acknowledgement.

In a fifth implementation, alone or in combination with one or more of the first through fourth implementations, a value associated with the LLDP TLV request is the candidate length of time, and a value associated with the LLDP TLV acknowledgement is the length of time.

In a sixth implementation, alone or in combination with one or more of the first through fifth implementations, the candidate length of time is a first candidate length of time, process 1500 includes transmitting, based on the time window, a request to disable the link for a second candidate length of time, transmitting the request to disable the link for the first candidate length of time includes transmitting the request to disable the link for the first candidate length of time a period of time after transmitting the request to disable the link for the second candidate length of time, and the length of time is based on the second candidate length of time and the period of time.

In a seventh implementation, alone or in combination with one or more of the first through sixth implementations, the request to disable the link for the second candidate length of time is an LLDP TLV request, process 1500 includes receiving a rejection associated with the request to disable the link for the second candidate length of time, the rejection associated with the request to disable the link for the second candidate length of time is an LLDP TLV acknowledgement, and a value associated with the LLDP TLV acknowledgement is zero.

Although FIG. 15 shows example blocks of process 1500, in some implementations, process 1500 includes additional blocks, fewer blocks, different blocks, or differently arranged blocks than those depicted in FIG. 15. Additionally, or alternatively, two or more of the blocks of process 1500 may be performed in parallel.

Figure 16:
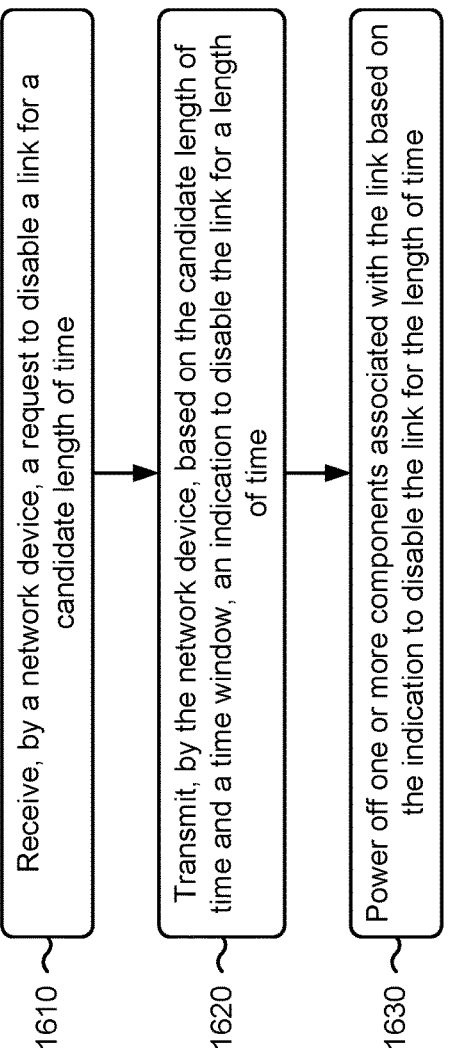
FIG. 16 is a flowchart of an example process associated with disabling a link for a length of time.

FIG. 16 is a flowchart of an example process 1600 associated with disabling a link for a length of time. In some implementations, one or more process blocks of FIG. 16 are performed by a network device (e.g., the second network device of FIG. 1). In some implementations, one or more process blocks of FIG. 16 are performed by another device or a group of devices separate from or including the network device, such as a peer device (e.g., peer device 1210) and/or a node (e.g., node 1220). Additionally, or alternatively, one or more process blocks of FIG. 16 may be performed by one or more components of device 1300, such as processor 1320, memory 1330, input component 1340, output component 1350, communication component 1360, input component 1410, switching and/or routing component 1420, output component 1430, and/or controller 1440.

As shown in FIG. 16, process 1600 may include receiving a request to disable a link for a candidate length of time (block 1610). For example, the network device may receive a request to disable a link for a candidate length of time, as described above.

As further shown in FIG. 16, process 1600 may include transmitting, based on the candidate length of time and a time window, an indication to disable the link for a length of time (block 1620). For example, the network device may transmit, based on the candidate length of time and a time window, an indication to disable the link for a length of time, as described above.

As further shown in FIG. 16, process 1600 may include powering off one or more components associated with the link based on the indication to disable the link for the length of time (block 1630). For example, the network device may power off one or more components associated with the link based on the indication to disable the link for the length of time, as described above.

Process 1600 may include additional implementations, such as any single implementation or any combination of implementations described below and/or in connection with one or more other processes described elsewhere herein.

In a first implementation, process 1600 includes disabling, by the network device, a link fault alarm associated with the link.

In a second implementation, alone or in combination with the first implementation, powering off the one or more components includes powering off the one or more components a hold time window after disabling the link fault alarm.

In a third implementation, alone or in combination with one or more of the first and second implementations, process 1600 includes powering on, by the network device, the one or more components associated with the link based on an expiry of the length of time.

In a fourth implementation, alone or in combination with one or more of the first through third implementations, process 1600 includes enabling, by the network device, a link fault alarm associated with the link.

In a fifth implementation, alone or in combination with one or more of the first through fourth implementations, enabling the link fault alarm includes enabling the link fault alarm based on a hold time window.

In a sixth implementation, alone or in combination with one or more of the first through fifth implementations, process 1600 includes storing, in persistent storage, one or more of an indication of the link, an indication of a start time associated with the length of time, an indication of the length of time, or an indication of an alarm associated with the link.

Although FIG. 16 shows example blocks of process 1600, in some implementations, process 1600 includes additional blocks, fewer blocks, different blocks, or differently arranged blocks than those depicted in FIG. 16. Additionally, or alternatively, two or more of the blocks of process 1600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a PDU, a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

transmitting, by a network device, based on a time window, a request to disable a link between the network device and another network device for a candidate length of time, wherein the request to disable the link for the candidate length of time is a link layer discovery protocol (LLDP) type-length-value (TLV) request;

receiving, by the network device, based on the candidate length of time, an indication to disable the link for a length of time from the other network device, wherein the length of time is less than the candidate length of time, and wherein the indication to disable the link for the length of time is an LLDP TLV acknowledgement; and powering off one or more components associated with the link based on the indication to disable the link for the length of time.

2. The method of claim 1, wherein the candidate length of time is a first candidate length of time, the method further comprising:

transmitting, by the network device, based on the time window, a request to disable the link for a second candidate length of time, wherein transmitting the request to disable the link for the first candidate length of time includes transmitting the request to disable the link for the first candidate length of time a period of time after transmitting the request to disable the link for the second candidate length of time, wherein the length of time is based on the second candidate length of time and the period of time.

3. The method of claim 2, wherein the method further comprising:

receiving, by the network device, a rejection associated with the request to disable the link for the second candidate length of time, wherein the rejection associated with the request to disable the link for the second candidate length of time is an LLDP TLV acknowledgement, and wherein a value associated with the LLDP TLV acknowledgement is zero.

4. The method of claim 1, wherein the time window is associated with off-peak network traffic for the network device, wherein another time window is associated with off-peak network traffic for the other network device associated with the link, and the time window and the other time window overlap for the length of time.

5. The method of claim 1, further comprising:

identifying, by the network device, the time window based on a policy.

6. The method of claim 1, further comprising:

identifying, by the network device, the time window based on a configuration.

7. The method of claim 1, wherein a value associated with the LLDP TLV request is the candidate length of time, and wherein a value associated with the LLDP TLV acknowledgement is the length of time.

8. A method, comprising:

receiving, by a network device, a request to disable a link between the network device and another network device for a candidate length of time, wherein the request to disable the link for the candidate length of time is a link layer discovery protocol (LLDP) type-length-value (TLV) request;

transmitting, by the network device, based on the candidate length of time and a time window, an indication to disable the link for a length of time from the other network device, wherein the length of time is less than the candidate length of time, and wherein the indication to disable the link for the length of time is an LLDP TLV acknowledgement; and powering off one or more components associated with the link based on the indication to disable the link for the length of time.

9. The method of claim 8, further comprising:

powering on, by the network device, the one or more components associated with the link based on an expiry of the length of time.

10. The method of claim 9, further comprising:

enabling, by the network device, a link fault alarm associated with the link.

11. The method of claim 10, wherein enabling the link fault alarm includes enabling the link fault alarm based on a hold time window.

12. The method of claim 8, further comprising:

disabling, by the network device, a link fault alarm associated with the link.

13. The method of claim 12, wherein powering off the one or more components includes powering off the one or more components a hold time window after disabling the link fault alarm.

14. The method of claim 8, further comprising:

storing, in persistent storage, one or more of an indication of the link, an indication of a start time associated with the length of time, an indication of the length of time, or an indication of an alarm associated with the link.

15. A network device, comprising:

one or more memories; and one or more processors to:

transmit, based on a time window, a request to disable a link between the network device and another network device for a candidate length of time, wherein the request to disable the link for the candidate length of time is a link layer discovery protocol (LLDP) type-length-value (TLV) request;

receive, based on the candidate length of time, an indication to disable the link for a length of time from the other network device, wherein the length of time is less than the candidate length of time, and wherein the indication to disable the link for the length of time is an LLDP TLV acknowledgement; and power off one or more components associated with the link based on the indication to disable the link for the length of time.

16. The network device of claim 15, wherein the one or more processors are further to:

disable a link fault alarm associated with the link.

17. The network device of claim 16, wherein the one or more processors, to disable the link fault alarm, are to disable the link fault alarm based on a hold time window.

18. The network device of claim 15, wherein the one or more processors are further to:

power on the one or more components associated with the link based on an expiry of the length of time.

19. The network device of claim 15, wherein the one or more processors are further to:

store one or more of an indication of the link, a start time associated with the length of time, the length of time, or a link fault alarm associated with the link.

20. The network device of claim 15, wherein the one or more processors are further to:

transmit, based on the time window, a request to disable the link for a second candidate length of time; and receive a rejection associated with the request to disable the link for the second candidate length of time, wherein the rejection associated with the request to disable the link for the second candidate length of time is an LLDP TLV acknowledgement, and wherein a value associated with the LLDP TLV acknowledgement is zero.

* * * * *